(12) United States Patent
Klerk et al.

(10) Patent No.: US 12,392,375 B2
(45) Date of Patent: Aug. 19, 2025

(54) SEALING MEMBER FOR BEARING HOUSING

(71) Applicant: NGI A/S, Nørresundby (DK)

(72) Inventors: Bo Nørgaard Klerk, Copenhagen (DK); Tomas Hecht Olsen, Klarup (DK)

(73) Assignee: NGI A/S, Nørresundby (DK)

( * ) Notice: Subject to any disclaimer, the term of this patent is extended or adjusted under 35 U.S.C. 154(b) by 137 days.

(21) Appl. No.: 17/791,882

(22) PCT Filed: Jan. 28, 2021

(86) PCT No.: PCT/EP2021/051939
§ 371 (c)(1),
(2) Date: Jul. 8, 2022

(87) PCT Pub. No.: WO2021/151985
PCT Pub. Date: Aug. 5, 2021

(65) Prior Publication Data
US 2023/0041821 A1    Feb. 9, 2023

(30) Foreign Application Priority Data

Jan. 30, 2020  (DK) .......................... PA 2020 00113
Dec. 22, 2020  (DK) .......................... PA 2020 01451

(51) Int. Cl.
*F16C 33/78*    (2006.01)
(52) U.S. Cl.
CPC ...... *F16C 33/7806* (2013.01); *F16C 33/7886* (2013.01)

(58) Field of Classification Search
CPC ........ F16C 35/02; F16C 35/04; F16C 35/042; F16C 35/045; F16C 35/047; F16C 33/723; F16C 33/7806; F16C 33/7886
See application file for complete search history.

(56) References Cited

U.S. PATENT DOCUMENTS 2,819,128 A * 1/1958 Downs ................. F16C 35/045
                                                  384/498
3,868,151 A * 2/1975 Derner ................. F16C 35/067
                                                  384/569

(Continued)

FOREIGN PATENT DOCUMENTS

CN     202883715 U    4/2013
CN     204152979 U    2/2015
(Continued)

OTHER PUBLICATIONS

Translation of JP2002139032 obtained Feb. 13, 2024.*
(Continued)

*Primary Examiner* — James Pilkington
(74) *Attorney, Agent, or Firm* — Nath, Goldberg & Meyer; Jerald L. Meyer

(57) ABSTRACT

A bearing housing (1) is fabricated with a bearing body (2) for holding a bearing (3); and a sealing member (4). The sealing member has a shaft insertion (6) for inserting a shaft into the bearing housing (1). The sealing member (4) is formed with a spherical outer surface (4a) which is movable in contact with the bearing housing body (2), and the sealing member (3) rests on the bearing (3) when installed in the bearing housing body (2). A circular opening (6) extends between a front-end circular opening (45) and a back-end circular opening (46), such that the back-end (42) is connected to the front-end (41) by a spherical structure (44).

12 Claims, 11 Drawing Sheets

SECTION A-A

(56) References Cited

U.S. PATENT DOCUMENTS

| | | | |
|---|---|---|---|
| 4,355,250 A | 10/1982 | Langdon | |
| 5,129,737 A * | 7/1992 | Stenner | F16C 35/02 |
| | | | 384/438 |
| 5,188,214 A | 2/1993 | Uttke et al. | |
| 5,421,442 A | 6/1995 | Agnoff | |
| 5,687,973 A | 11/1997 | Ruppert, Jr. | |
| 5,927,864 A * | 7/1999 | Feerick | F16C 33/7869 |
| | | | 384/482 |
| 6,076,647 A | 6/2000 | Agnoff | |
| 9,226,441 B2 * | 1/2016 | Ciulla | F16C 33/586 |
| 9,651,093 B2 | 5/2017 | Robb, Jr. | |
| 2007/0004235 A1 | 1/2007 | Thomas | |
| 2008/0219612 A1 | 9/2008 | Smith et al. | |
| 2009/0279820 A1 | 11/2009 | Nishide et al. | |
| 2011/0262059 A1 | 10/2011 | Karaki et al. | |
| 2011/0284346 A1 | 11/2011 | Dunn | |
| 2014/0004964 A1 | 1/2014 | Nevers et al. | |

FOREIGN PATENT DOCUMENTS

| | | | |
|---|---|---|---|
| CN | 105408635 A | 3/2016 | |
| DE | 2839585 A1 | 3/1980 | |
| DE | 10 2013 221 600 A1 | 4/2015 | |
| DE | 20 2017 101 399 U1 | 5/2017 | |
| DE | 20 2012 013 567 U1 | 12/2017 | |
| EP | 1378983 A2 | 1/2004 | |
| EP | 1503096 A2 * | 2/2005 | F16C 27/066 |
| FR | 402.799 A | 5/1909 | |
| FR | 2742727 A1 | 6/1997 | |
| FR | 3019869 A1 | 10/2015 | |
| GB | 2030659 A | 4/1980 | |
| GB | 2563706 A | 12/2018 | |
| JP | 49-7329 A | 1/1974 | |
| JP | 2002139032 A * | 5/2002 | F16C 33/60 |
| JP | 2008-121761 A | 5/2008 | |
| WO | 2005/033532 A1 | 4/2005 | |
| WO | 2009/042478 A1 | 4/2009 | |
| WO | 2009/131594 A1 | 10/2009 | |
| WO | 2010/107855 A1 | 9/2010 | |

OTHER PUBLICATIONS

Search Report dated Jan. 12, 2021 issued in Danish Application No. PA 2020 01451.
Search Report dated Aug. 25, 2020 issued in Danish Application No. PA 2020 00113.
Search Report and Written Opinion dated May 6, 2021 issued in corresponding International Application No. PCT/EP2021/051939.

* cited by examiner

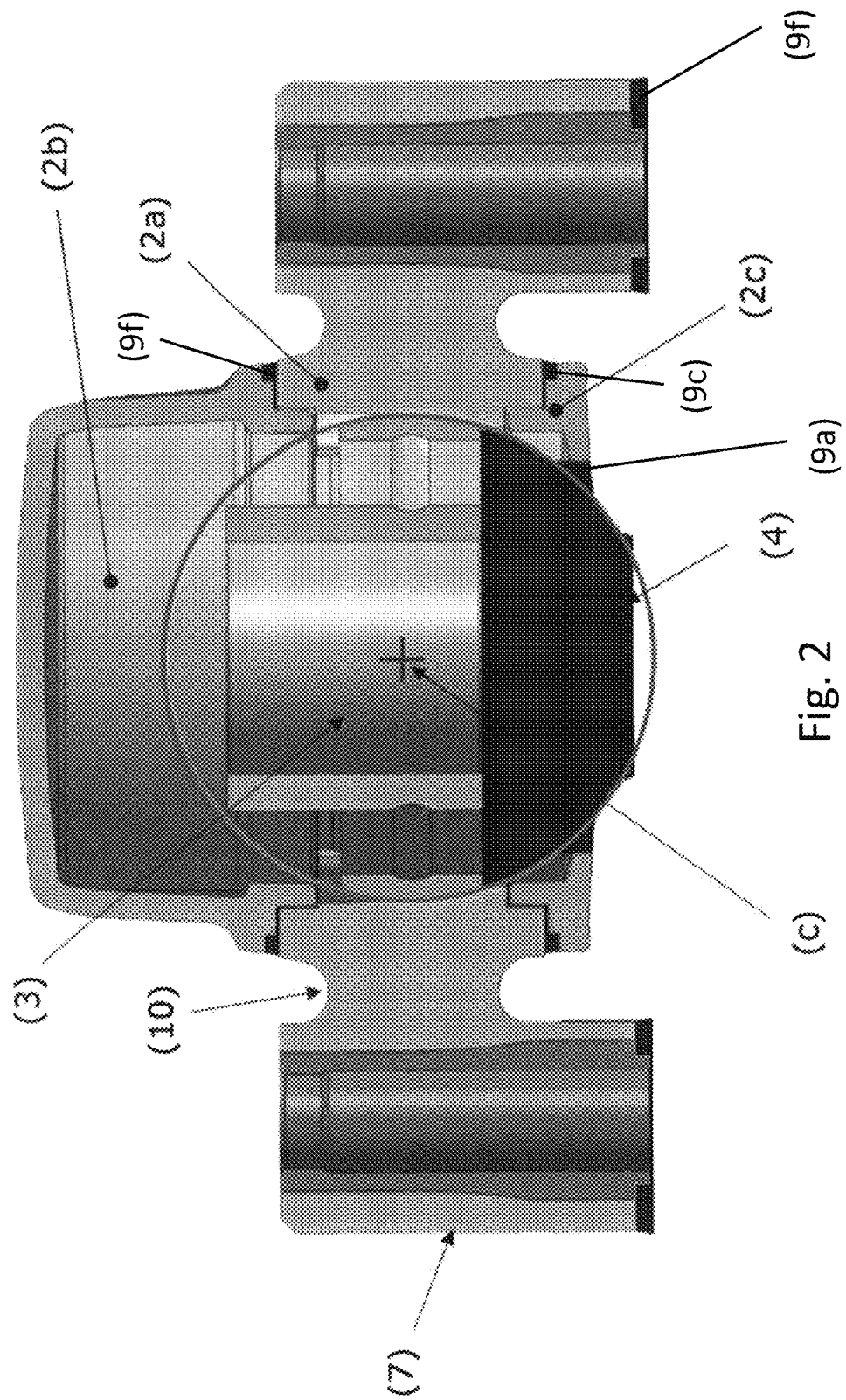

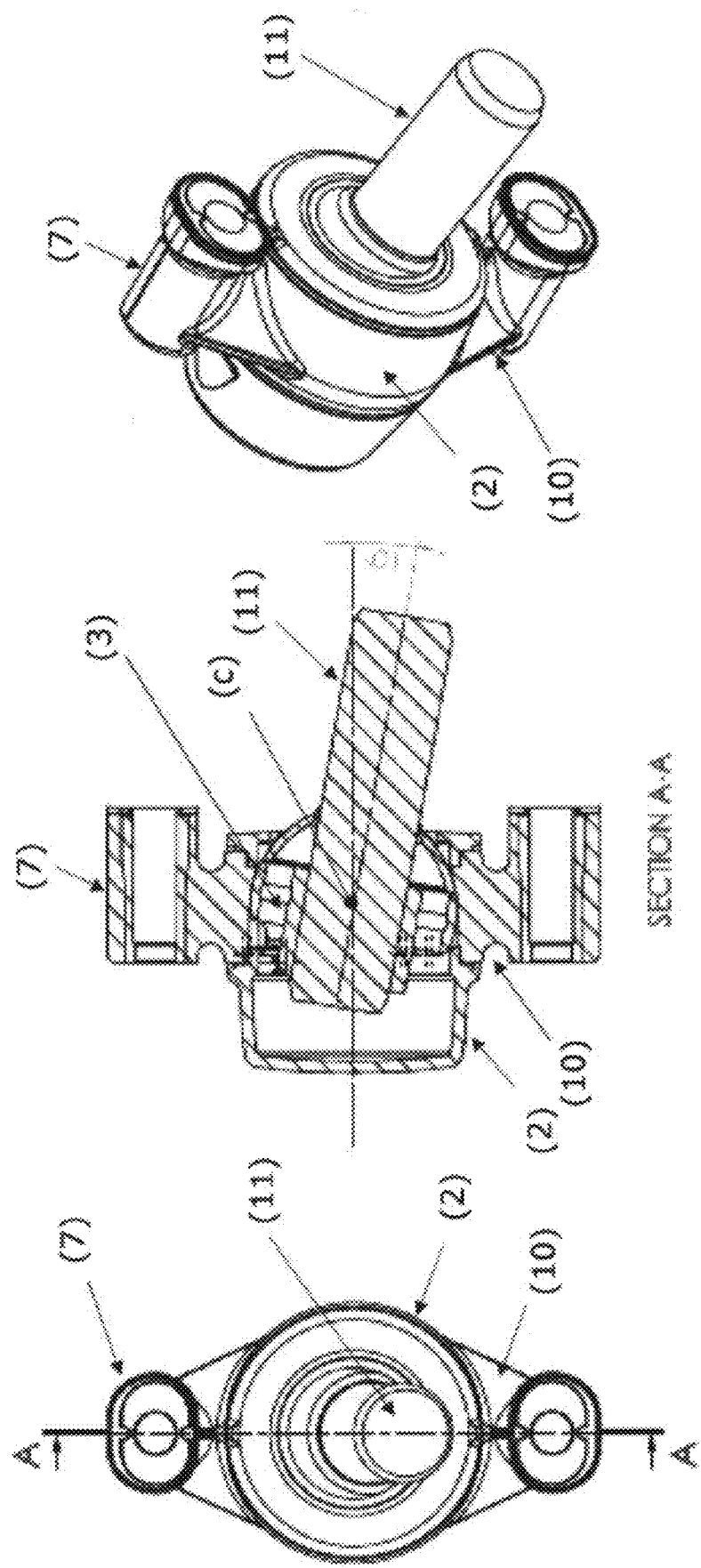

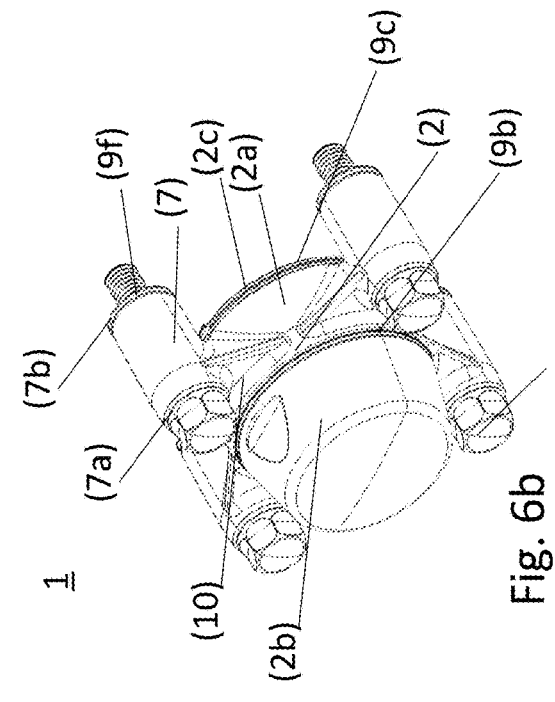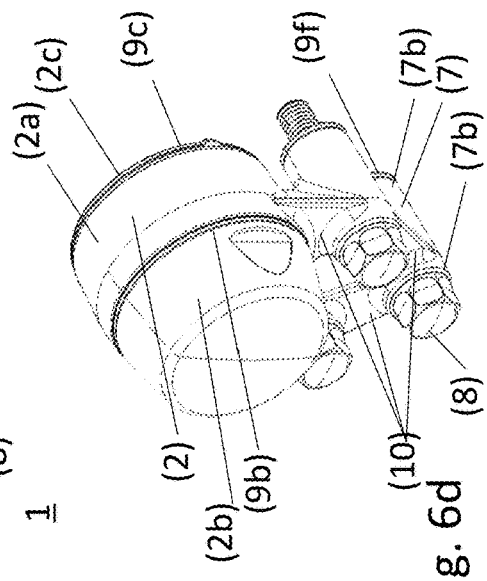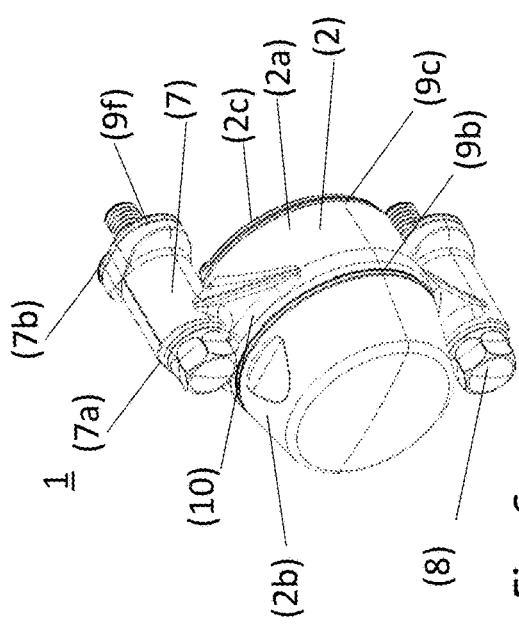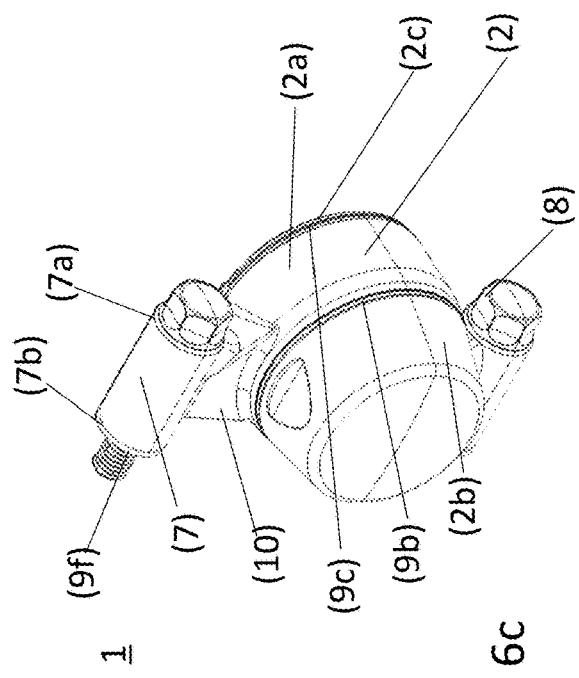
Fig. 6a
Fig. 6b
Fig. 6c
Fig. 6d

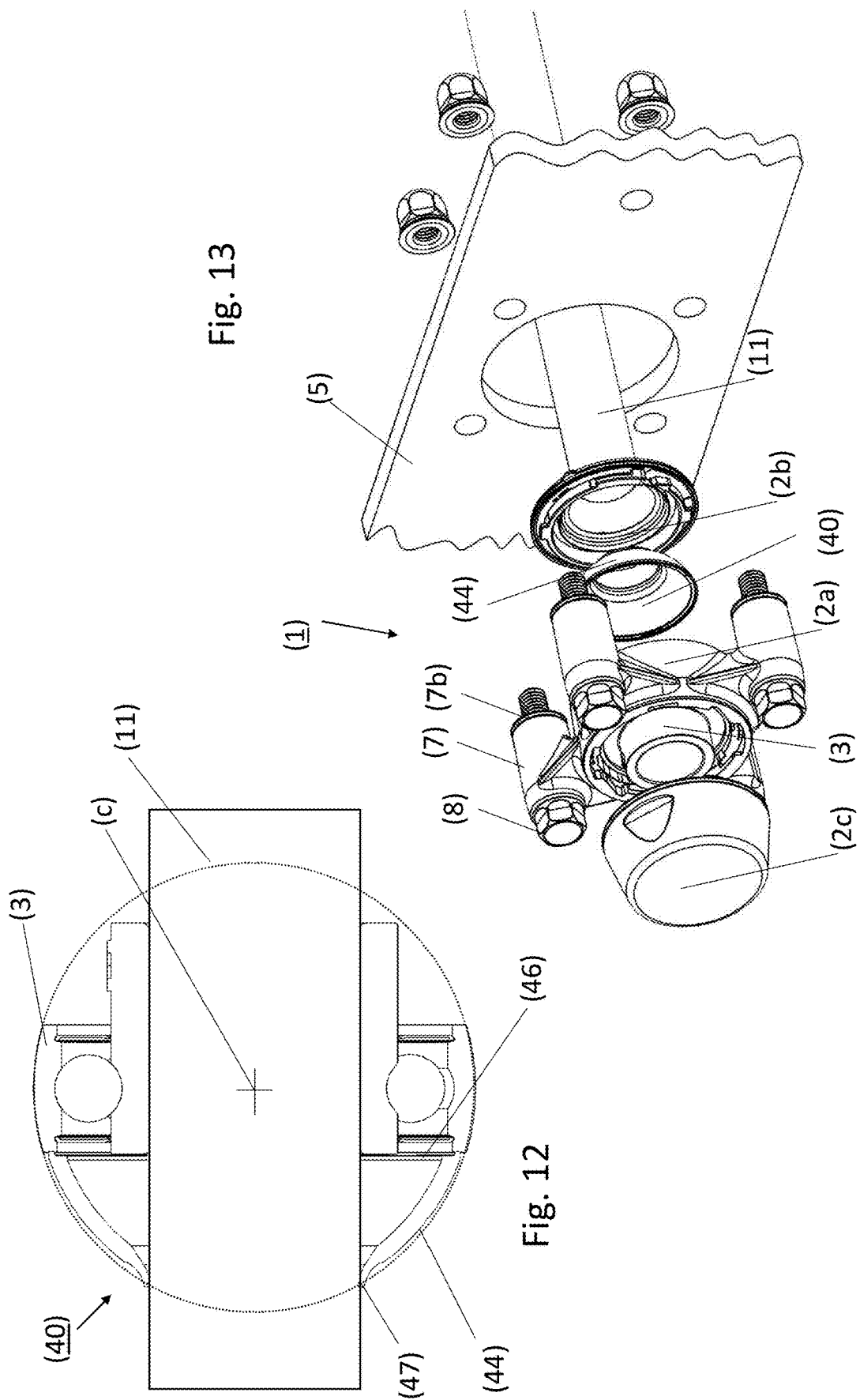

SEALING MEMBER FOR BEARING HOUSING

This is a National Phase Application filed under 35 U.S.C. 371 as a national stage of PCT/EP2021/051939, filed Jan. 28, 2021, an application claiming the benefit of Denmark Application No. PA 2020 00113, filed Jan. 30, 2020 and Denmark Application No. PA 2020 01451, filed Dec. 22, 2020, the content of each of which is hereby incorporated by reference in its entirety.

TECHNICAL FIELD

The present invention relates to a bearing housing for use in environments where the environmental hygiene is highly prioritised. In particular the present invention relates to a waterproof bearing housing for use in environments where the environmental hygiene is highly prioritised, and where an increased angular movement of the shaft may be provided, when inserted into the bearing housing, without compromising the waterproof effect, resulting in a reduction in maintenance and a limitation or even avoiding deposit or accumulation of dirt, grime, microbial material, or allergens, on, in or around the bearing housing.

BACKGROUND

For the last decade, the food and beverage industry has seen a significant increase in products that needs to be recalled because of contamination of microorganisms, allergens or dirt that are not intended to be present in the food product.

In this respect bacterial contamination and undeclared allergens together represent about 75% of the top FDA food recall causes based on units.

Many companies provide strict guidelines and measures on safety practice in the production zones to protect the food products. These might include measures such as posted signs encouraging hand-washing or purchasing hygienically designed "food grade" machines.

Due to the increasing number of recalls proactive food safety has become the foremost concern for food and beverage executives and different approached are used to reduce or avoid the contaminated food product.

One approach is inspection or regulatory control of food products and production lines which is highly undesirable for the manufacture as inspection or control is time consuming and costly. Results of the inspection or control may lead to closure of the process line until the devices and equipment have been properly cleaned. This clearly has a strong impact on the turnover of the manufacturer in respect of down time, and no product production.

Thus, the alternative approach is to ensure proper cleaning of the devices and equipment to ensure a clean and un-contaminated environment and to ensure the food safety is in top.

One of the risk zones for contamination with dirt, microorganisms and allergens and that has shown to be difficult to clean properly is the bearing housings and around the bearing housings.

One problem with bearing housings provided today is that the waterproof sealing of the bearing housing may be challenged during installation since a misalignment of more than 1.5 degree may lead to an angular movement of the shaft into the bearing and stresses the seal which may deform, leaving gaps open for entry of water into the bearing housing, resulting lack of waterproof effect as well as corrosion and additional wear of the bearing. Furthermore, dirt, grime, microbial material, or allergens may hide, deposit or accumulate in bearing housing and cleaning may become troublesome and contamination of the products produced may be highly possible.

In order to maintain the waterproof effect of the bearing housing, lubricant or grease are used, often in large amounts, to keep water outside the bearing housing. Such lubrication has a significant negative impact on the hygiene since lubrication of bearings, and in particular excess of lubricant may provide a safe place for contamination to hide and accumulate.

Hence, an improved bearing housing would be advantageous, and in particular a bearing housing which is waterproof, even at increased angular movements when misaligned during installation, whereby wash-down and cleaning may be more efficient and/or more reliable resulting in a limitation or even to avoid deposit or accumulation of dirt, grime, microbial material, or allergens, on, in or around the bearing housing, even when misaligned would be advantageous.

SUMMARY OF THE INVENTION

Thus, an object of the present invention relates to a bearing housing for use in environments where the environmental hygiene is highly prioritised.

In particular, it is an object of the present invention to provide a water proof bearing housing that allows increased angular movements of the shaft when inserted into the bearing housing, e.g. when misaligned during installation, without compromising the waterproof effect, resulting in a reduction in maintenance and allowing wash-down and cleaning to be more efficient and/or more reliable compared to prior art bearing housings whereby the above mentioned problems of the prior art with lubrication, and deposit and accumulation of dirt, grime, microbial material, or allergens, on, in or around the bearing housing may be reduced or even avoided.

Thus, one aspect of the invention relates to a bearing housing comprising a bearing body for holding a bearing; and a sealing member forming a shaft insertion for inserting a shaft into the bearing housing, the sealing member is formed with a spherical outer surface which is movable in contact with the bearing housing body and the sealing member rests on the bearing when installed in the bearing housing body.

Another aspect of the present invention relates to the use of the bearing housing according to the present invention, for use in environments with high hygienic requirements, high cleaning requirements and/or environments where low (or no) deposit or accumulation of dirt, grime, microbial material and/or allergens is accepted.

Yet another aspect of the present invention relates to the use of the bearing housing according to the present invention, for use in food production industry, feed production industry, and/or pharmaceutical industry.

A further aspect of the present invention relates to a sleeve comprising a circular front-end and a circular back-end, and a circular opening going through the centre of the circular front-end and the circular back-end, wherein the back-end is connected to the front-end by a spherical structure.

An even further aspect of the present invention relates to the use of a sleeve comprising a polymer material as a seal and as a slide bearing.

Another aspect of the present invention relates to the use of the sleeve according to the present invention in a bearing housing according to the present invention.

Still another aspect of the present invention relates to a device comprising a bearing housing according to the present invention, preferably, a hygienic device.

BRIEF DESCRIPTION OF THE DRAWINGS

FIG. 2 discloses a cross-sectional view of the first embodiment shown in FIG. 1.

FIG. 5a-5c discloses a bottom view, a cross-sectional view and a perspective view of the first embodiment in a state where the shaft has a larger angular deviation (10°).

FIG. 6a-6d shows four embodiments of hygienic bearing housings according to the invention where the number and positions of arms and feet are varied.

FIG. 12 illustrates the interaction between a sealing member, a shaft and a bearing according to the invention.

FIG. 13 discloses an explosion view of the hygienic bearing housing according to the present invention relative to a machine to which it is fastened.

DETAILED DESCRIPTION

Figure 1:
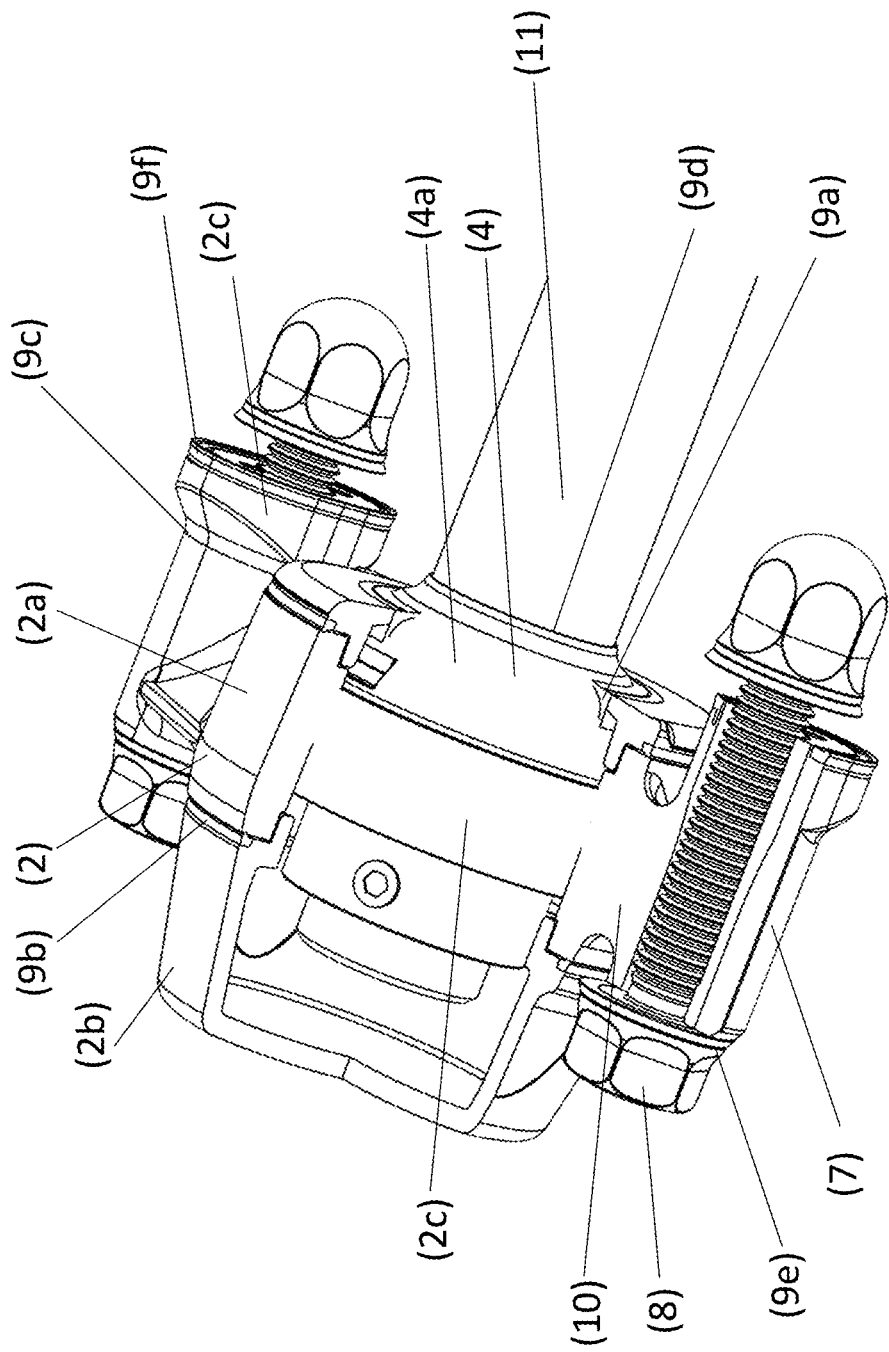
FIG. 1 discloses a partially cut-through view of a first embodiment of a bearing housing comprising a sealing element according to the invention.

FIG. 1 shows a hygienic bearing housing (1) comprising a bearing body (2) for holding a bearing (3); and a sealing member (4) forming a shaft insertion (6) for inserting a shaft into the bearing housing (1), the sealing member (4) is formed with a spherical outer surface (4a) which is movable in contact with the bearing housing body (2) and the sealing member (4) rests on the bearing (3) when installed in the bearing housing body (2). The sealing member (4) comprises a further seal (9a) between the bearing housing body (2) and the sealing member (4).

The spherical structure of the outside surface of the sealing member (4) may be in contact with a removable flat cover (2c) which is attached to a fixed bearing housing body (2a). When a bearing (3) is installed in the bearing housing body (2) the removable flat cover (2c) presses the sealing member (4) against the bearing (3). The removable flat cover (2c) is in contact with the sealing member (4) and a seal (9a) is provide between the removable flat cover (2c) (or the bearing housing body (2)) and the sealing member (4). The removable flat cover (2c) also comprises a seal (9c) between the removable flat cover (2c) and the fixed bearing housing body (2a).

On the opposite side of the removable flat cover (2c) a removable bearing housing cover (2b) is attached to the fixed bearing housing body (2a). A seal (9b) is provided between the fixed bearing housing body (2a) and the removable bearing housing cover (2b).

FIG. 1 shows a bearing housing (1) having a closed end with a bearing housing cover (2b). However, if the shaft passes through the bearing housing, a seal construction according to the invention as described above may be arranged on each side of the bearing housing body (2a).

Preferably, one or more seals (9) introduced into the bearing housing (1) are configured with contours, which are adapted to the surfaces of the bearing housing and thereby substantially ensure continuous surfaces. Preferably, one or more of the seals (9a), (9b), (9c), (9d), (9e), and/or (9f) are configured with contours, which are adapted to the surfaces of the bearing housing and thereby substantially ensure continuous surfaces of the bearing housing (1).

The sealing member (4) rests on the bearing (3) and the combined bearing (3) and the sealing member (4) may form a spherical structure, e.g. forming a spherical seal, such as a ball or a half-ball like structure having the same spherical centre. The combined bearing (3) and the sealing member (4) is movable in contact with the bearing housing body (2) and the shaft (11) is capable of angular movement. around the spherical centre of the sealing member (4) following a movement around a structure like a cone starting from the spherical centre. In addition to the angular movement of the shaft (11) when inserted into the bearing housing (1), the shaft (11) may perform a rotation movement. The rotation movement may be performed around a longitudinal direction of the shaft or around the centreline of the shaft, starting from the spherical centre.

Misalignments that may cause angular movement of the shaft (11); the sealing member (4) and/or the bearing (3), may be caused by an angular misalignment of connected bearing housings and/or a parallel misalignment of connected bearing housings.

In the construction shown in FIG. 1, the shaft (11) (and the sealing member (4) and/or the sealing member (4) and the bearing (3)) is capable of an angular movement of above 3.5 degrees or more; in the range of 3.5-degrees, without stressing the bearing or inducing undesirable deformation of the seals, whereby the bearing and the bearing housing is kept waterproof.

The bearing housing body (2) comprises two or more bearing housing feet (7), for attaching the bearing housing (1) to a base (5) using attachment means (8), such as bolts and nuts. The bearing housing is attached to the base by bolt and nuts and in the joint between the bolt and the feet and the nut and the feet a seal (9e) is provided. Each of the bearing housing feet (7) extends from the bearing housing body (2) by the means of a arm (10).

FIG. 2 shows a cross-section figure of the hygienic bearing housing (1) according to the present invention. The hygienic bearing housing (1) comprising a bearing body (2) for holding a bearing (3); and a sealing member (4) forming a shaft insertion (6) for inserting a shaft into the bearing housing (1). The bearing housing (1) is provided with two bearing housing feet (7) which extends from the bearing housing body (2) by the means of a arm (10). The bearing housing body comprises a fixed bearing housing body (2a), a removable bearing housing cover (2b); and a removable bearing housing flat cover (2c).

The removable bearing housing flat cover (2c) presses the sealing member (4) against the bearing (3) when coupled to the fixed bearing housing body (2a). The sealing member (4) is in combination with the bearing (3) forming a spherical structure, a two-dimensional structure of this has been illustrated in FIG. 2 by the solid circle.

When the sealing member (4) rests on the bearing (3) a spherical structure, such as a ball or a half-ball like structure, may be formed having the same spherical centre—the spherical centre (c). The shaft (not shown in FIG. 2) is, when inserted into the bearing housing (1), capable of angular movement around the spherical centre (c). The angular movement around the spherical centre (c) may in the direction of a cone starting from the spherical centre (c) and around a longitudinal direction of the shaft or around the centreline of the shaft, starting from the spherical centre (c) and out of the bearing housing (1).

The shaft (and the sealing member (4) and the bearing (3)) is capable of an angular movement of above 3.5 degrees or more; preferably in the range of 3.5-17 degrees, without stressing the bearing or inducing undesirable deformation of the seals, whereby the bearing (2) and the bearing housing body (2) is kept waterproof.

Figures 3A, 3B, 3C:
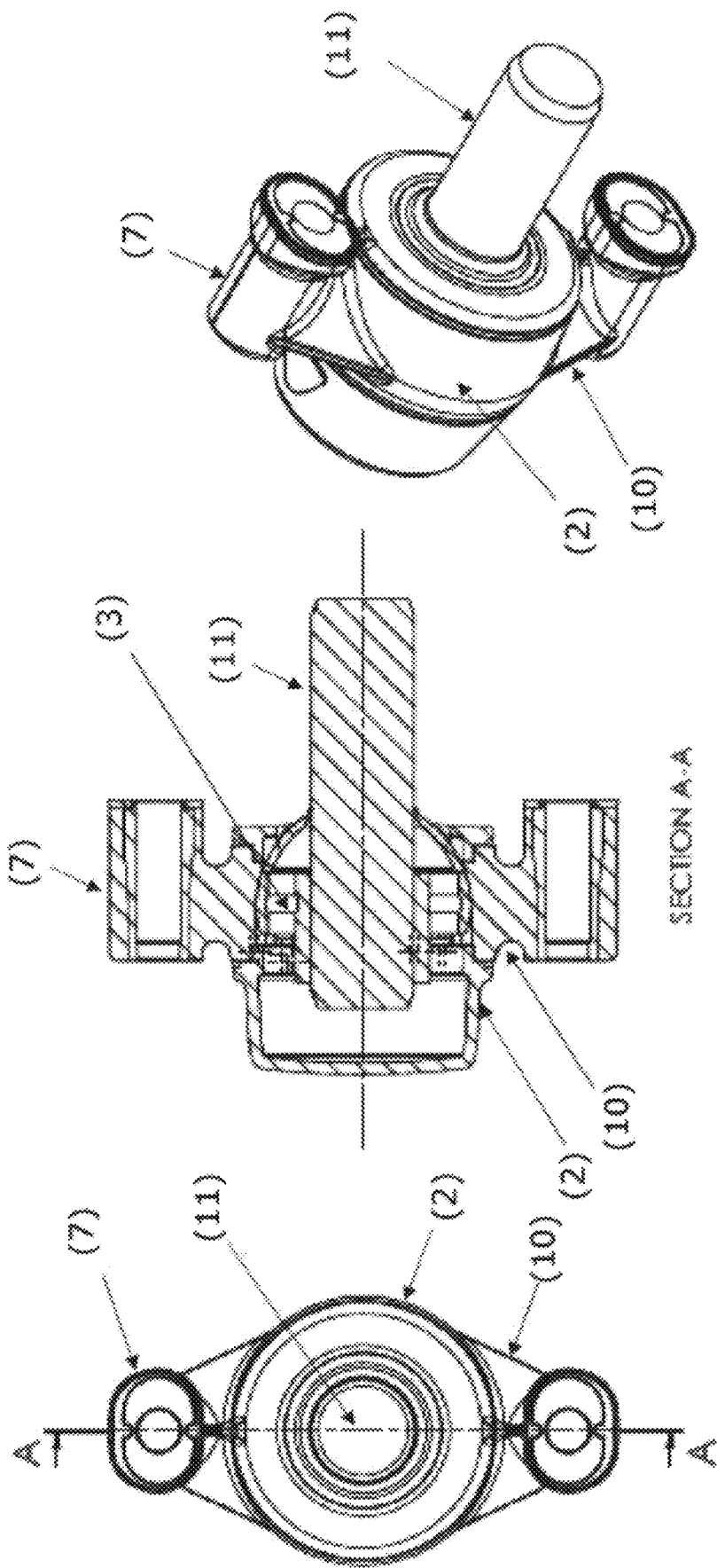
FIG. 3a-3c discloses a bottom view, a cross-sectional view and a perspective view of the first embodiment in a state where the shaft has no angular deviation (0°).
Figures 4A, 4B, 4C:
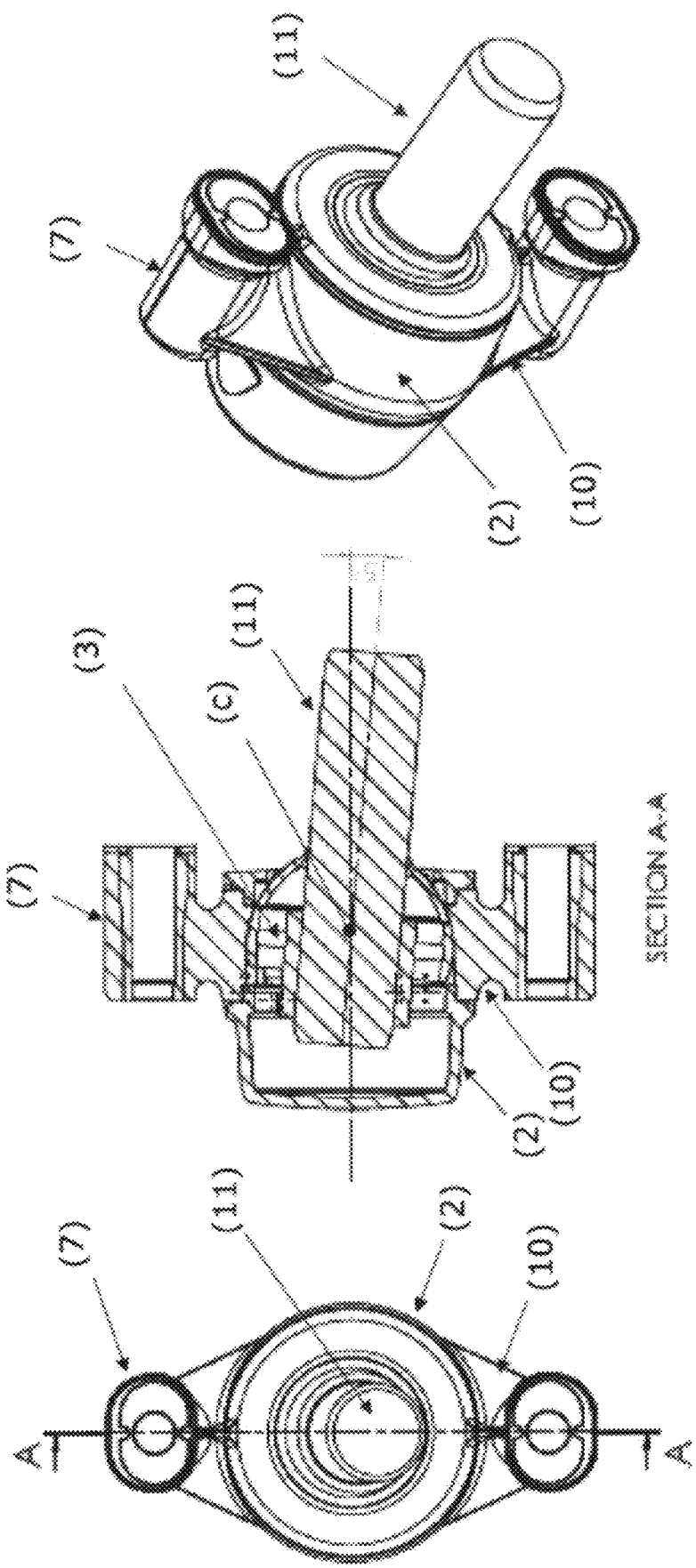
FIG. 4a-4c discloses a bottom view, a cross-sectional view and a perspective view of the first embodiment in a state where the shaft has a small angular deviation (5°).

FIGS. 3-5 show the effects achieved by the bearing housing (1) according to the present invention. The bearing housings (1) shown in FIGS. 3, 4, and 5 are the same as shown in FIGS. 1 and 2, wherein the angular movement around the spherical centre (c) has been shown. FIG. 3 shows not angular movement (0°), FIG. 4 shows 5 degrees angular movement (5°); and FIG. 5 shows 10 degrees angular movement (10°).

FIG. 6 shows the backside of 4 different variations of a hygienic bearing housing (1) according to the present invention defined by FIG. 6a, FIG. 6b, FIG. 6c, and FIG. 6d. The bearing housing (1) comprises a bearing housing body (2) for receiving a rotating shaft (not shown in FIG. 6), and two or more bearing housing feet (7) for attaching the bearing housing (1) to a base. Each of the two or more bearing housing feet (7) extends from the bearing housing body (2) by the means of a arm (10).

FIG. 6a shows a bearing housing (1) comprising two bearing housing feet (7). The two bearing housing feet (7) are orientated in the longitudinal direction relative to the direction of a rotating shaft to be inserted into the bearing housing (1). FIG. 6b shows a bearing housing (1) comprising 4 bearing housing feet (7). The 4 bearing housing feet (7) are orientated in the longitudinal direction relative to the direction of a rotating shaft to be inserted into the bearing housing (1). FIG. 1c shows a bearing housing (1) comprising two bearing housing feet (7). The two bearing housing feet (7) are orientated in the perpendicular direction relative to the direction of a rotating shaft to be inserted into the bearing housing (1). FIG. 1d shows a bearing housing (1) comprising three bearing housing feet (7). The three bearing housing feet (7) are orientated in the longitudinal direction relative to the direction of a rotating shaft to be inserted into the bearing housing (1).

FIGS. 6a, 6b, and 6c show bearing housing feet (7) that are symmetrically distributed around the bearing housing base (2). FIG. 6d shows a bearing housing (1) comprising three bearing housing feet (7) where the three bearing housing feet (7) are asymmetrically distributed around the bearing housing base (2) and one bearing housing foot (7) is to attached to the bearing housing body (2) via one or more other bearing housing foot (7). Preferably a circular connection of bearing housing feet (7) may be provided, see FIG. 6d.

It is shown in the FIG. 6 that the bearing housing feet (7) has a length which is larger (determined from the top of the bearing feet (7a) to the base end of the bearing feet (7b)) than the height of the arm (10). Actually, the bearing housing feet (7) are the only parts of the bearing housing which is in contact with the base when the bearing housing (1) is attached to the base. As the bearing housing base (2) and the arm (10) are not in contact with the base when attached to the base the open space created between the bearing housing body (2) (and the arm (10)) and the base (when attached to the base) allows for easy access for cleaning the bearing housing from all angles.

The bearing housing body (2) comprises a fixed bearing housing body (2a) connected, via the arm (10), with the two bearing housing feet (7) (FIGS. 6a and 6c), the three bearing housing feet (7) (FIG. 6d), or the 4 bearing housing feet (7) (FIG. 6b), and a removable bearing housing cover (2b) which is attached to the fixed bearing housing body (2a). On the opposite site of the fixed bearing housing body (2a) and relative to the removable bearing housing cover (2b) of, a removable flat cover (2c) is provided. The removable flat cover (2c) comprises a shaft insertion (not shown).

Between the fixed bearing housing body (2a) and the removable flat cover (2c) and between the fixed bearing housing body (2a) and the removable bearing housing cover (2b) a seal ((9c) and (9b) respectively) is inserted to ensure that water does not enter the bearing housing (1) in these joints. The seals (9) are configured with contours which are adapted to the structure of the surfaces connected or elements connected and thereby substantially ensure a continuous or substantially continuous surface in the joints between surfaces or elements connected, resulting in that dirt, grime, microbial material (such as bacteria or fungus), or other fouling materials (e.g. allergens), may be hindered or prevented from hiding and/or accumulating.

A seal (9f) is also provided in the base end of each of the bearing housing feet (7b) to avoid accumulation of dirt, grime, microbial material, or other fouling materials in the joint between the bearing housing body (2) and the base.

The seals (9) may be prepared from a non-conductive soft silicone material. With a blue color, RAL 5010, which provides an improved visual inspection of the hygienic level and/or cleaning quality.

The seals (9) according to the present invention assist in providing a bearing housing being waterproof by blocking entering of water, dirt and microbial activity.

The bearing housing feet (7) comprises attachment means (8), such as bolts and nuts for attaching the bearing housing (1) to the base.

The bearing housing (1) may be made of a sturdy polypropylene material and the surface of the bearing housing (1) is made smooth to allow drainage of water from the surface. The surface of the bearing housing (1) has a roughness below Ra 2.0 µm; such as Ra 1.8 µm; e.g. Ra 1.6 µm; such as Ra 1.4 µm; e.g. Ra 1.2 µm; such as Ra 1.0 µm; e.g. Ra 0.8 µm; such as Ra 0.6 µm; e.g. Ra 0.4 µm.

Inside the bearing housing (1) a bearing suitable for receiving a rotating shaft is installed. The bearing may be a ceramic bearing or a stainless-steel bearing.

Figure 7:
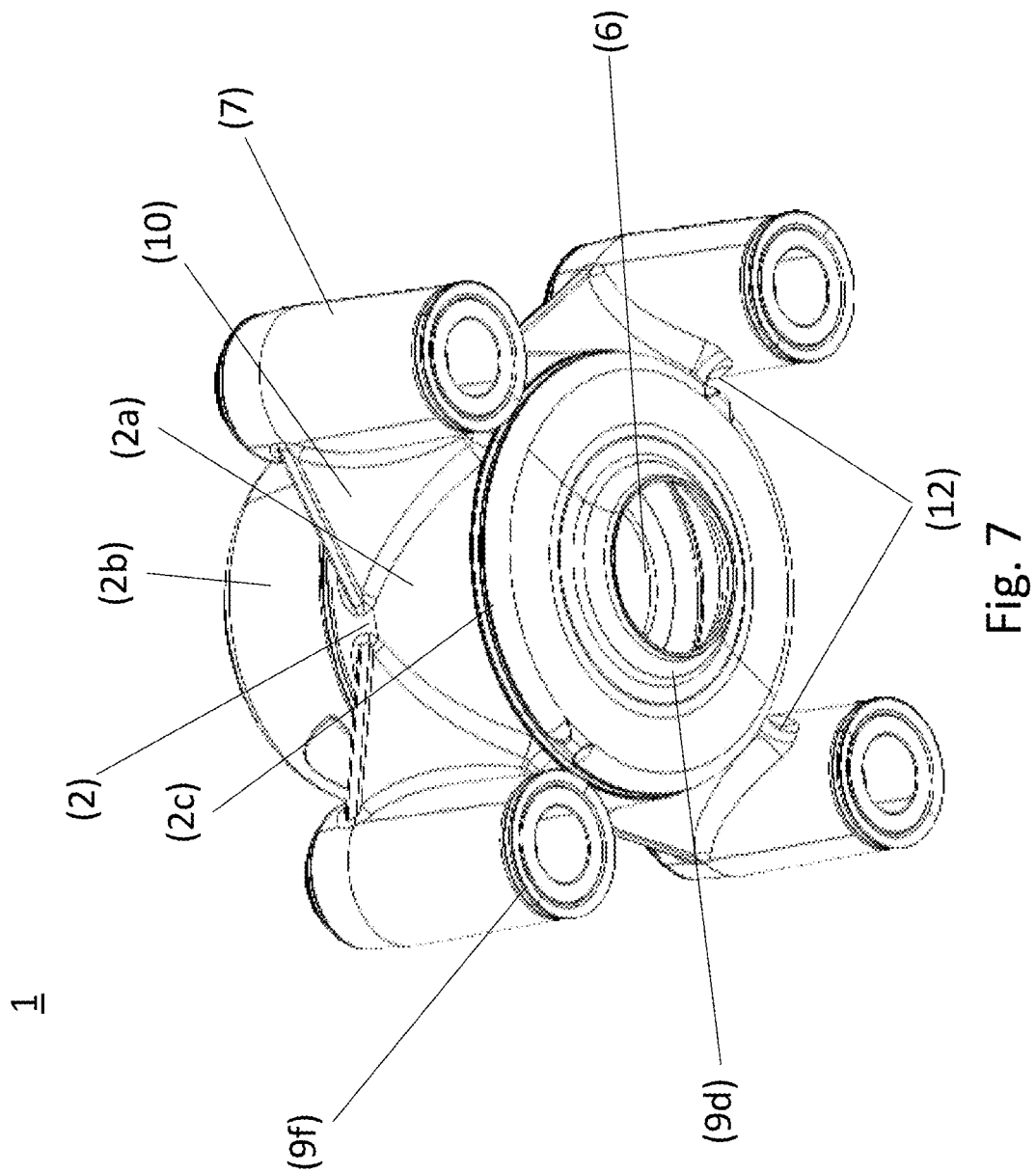
FIG. 7 discloses a perspective view of an embodiment of a bearing housing comprising four arms and feet.

FIG. 7 shows the front side of a hygienic bearing housing (1) according to the present invention. The bearing housing (1) comprises a bearing housing body (2) for receiving a rotating shaft (not shown), and 4 bearing housing feet (7) for attaching the bearing housing (1) to a base. Each of the bearing housing feet (7) extends from the bearing housing body (2) by the means of a arm (10).

At the base end of the bearing feet (7b), which are the only parts of the bearing housing which is in contact with the base when the bearing housing (1) is attached to the base, a seal (9f) is provided.

The bearing housing body (2) comprises:
a fixed bearing housing body (2a) connected, via the arm (10), with two bearing housing feet (7); and
a removable flat cover (2c) comprising a shaft insertion (6).

Inside the bearing housing base (2) a bearing is installed to suitable for receiving a rotating shaft, and a seal (9d) is provided which may be in contact with the shaft when the shaft is inserted into the bearing housing body (2). The seal (9d) and the spherical outer surface (4) may be the same material and preferably in one piece, or the seal (9d) and the spherical outer surface (4) may be different materials. Preferably, the seal (9d) and the spherical outer surface (4) may be the same material and preferably in one piece.

The arm (10) is formed as a polyhedron, in particular as a triangular prism. The first end of the two triangular ends is attached to the bearing housing body (2) and the second end of the two triangular parts is attached to one of the two bearing housing feet (7). The first triangular end has a curative end having a radius relative to the radius of the bearing housing body (2) which is larger than the radius of the curative end attached to each of the bearing housing feet (7).

The arm (10) has a length (1) determining how far each of the bearing housing feet (7) extends from the bearing housing body (2); a height (h) determined in the direction from the bearing housing (1) to the base and a width (w) determined in the direction perpendicular to the direction from the bearing housing (1) to the base.

The arm (10) is formed as an integrated part of the fixed bearing housing body (2a) and the two bearing housing feet (7) during moulding.

The arm (10) is not in contact with the base when the bearing housing (1) is attached to the base.

The tip (12) of the arm (10) which is formed as a polyhedron, in particular as a triangular prism, is pointing towards the base. This structure of the arm (10) improves cleaning around the bearing housing with improved access for cleaning from all sides and angles of the bearing housing, and improved drainage of water.

Figure 8:
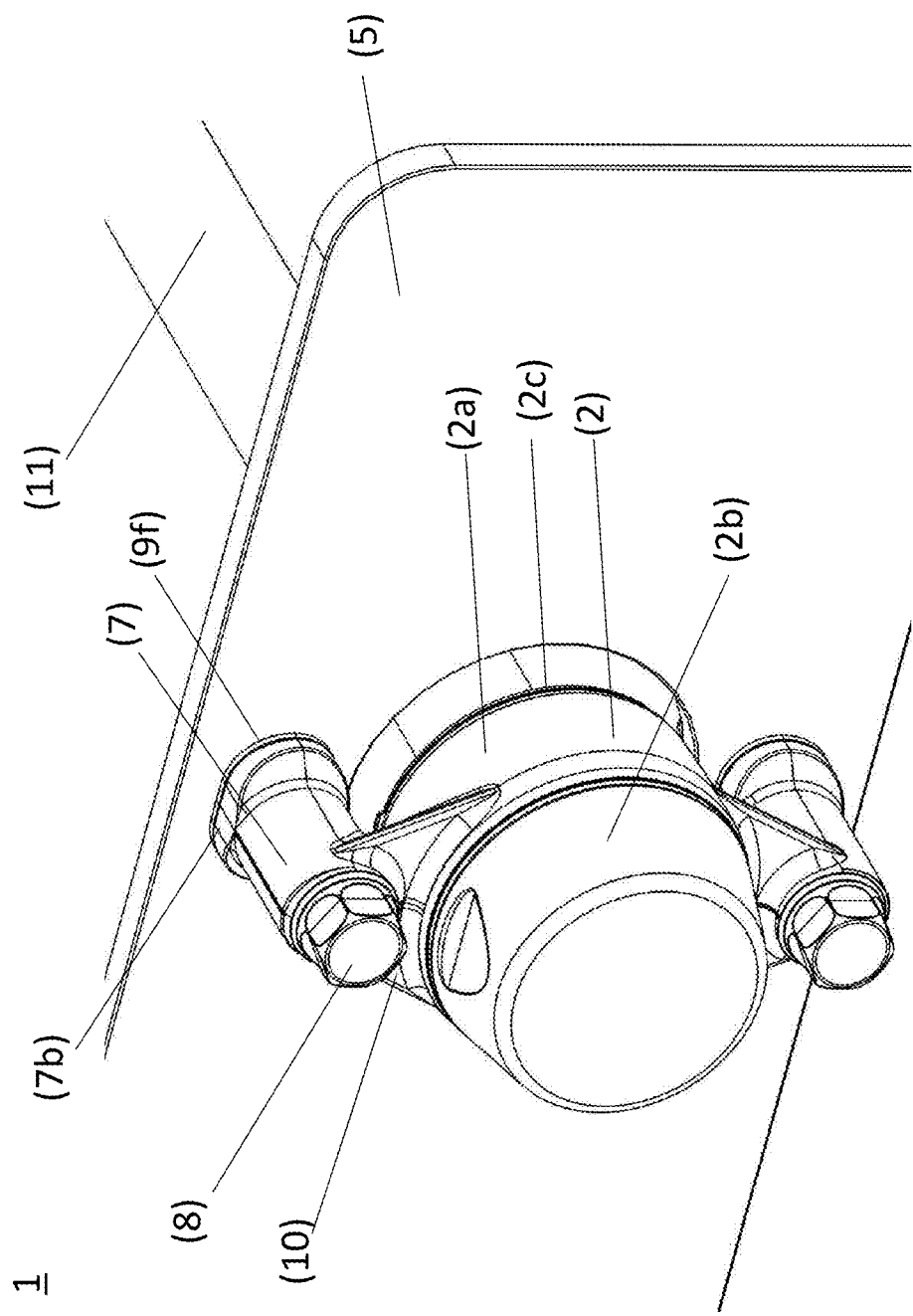
FIG. 8 discloses a perspective view of the first embodiment of the bearing housing in an operational state fastened to a machine.

FIG. 8 shows a hygienic bearing housing (1) according to the present invention. The bearing housing (1) comprises a bearing housing body (2) for receiving a rotating shaft (11), and 4 bearing housing feet (7) for attaching the bearing housing (1) to a base. Each of the four bearing housing feet (7) extends from the bearing housing body (2) by the means of a arm (10).

The bearing housing body (2) comprises a fixed bearing housing body (2a), a removable bearing housing cover (2b); and a removable flat cover (2c) comprising a shaft insertion for inserting the shaft (11).

In an embodiment of the present invention the bearing housing body (2) may comprise a fixed bearing housing body (2a), a removable bearing housing cover (2b); and a removable flat cover (2c), wherein the removable flat cover (2c) comprising a shaft insertion for inserting the shaft (11) and wherein the removable bearing housing cover (2b) comprising a shaft insertion (6) for inserting the shaft (11). Such construction of the bearing housing according to the present invention may be provided for bearing housings where the shaft goes through the bearing housing and thus two shaft insertions (6) are needed, one shaft insertions (6) for entering the shaft (11) into the bearing housing (1) and one for exiting the shaft (11) from the bearing housing (1).

The bearing housing (1) according to the present invention is attached using attachment means (8), such as bolts, to a base (5) at the base end of the bearing feet (7b), which are the only parts of the bearing housing which is in contact with the base (5) when the bearing housing (1) is attached to the base a seal (9f) is provided.

The bearing housing body (2) comprises:
a fixed bearing housing body (2a) connected, via the arm (10), with two bearing housing feet (7); and
a removable flat cover (2c) comprising a shaft insertion.

Figure 9:
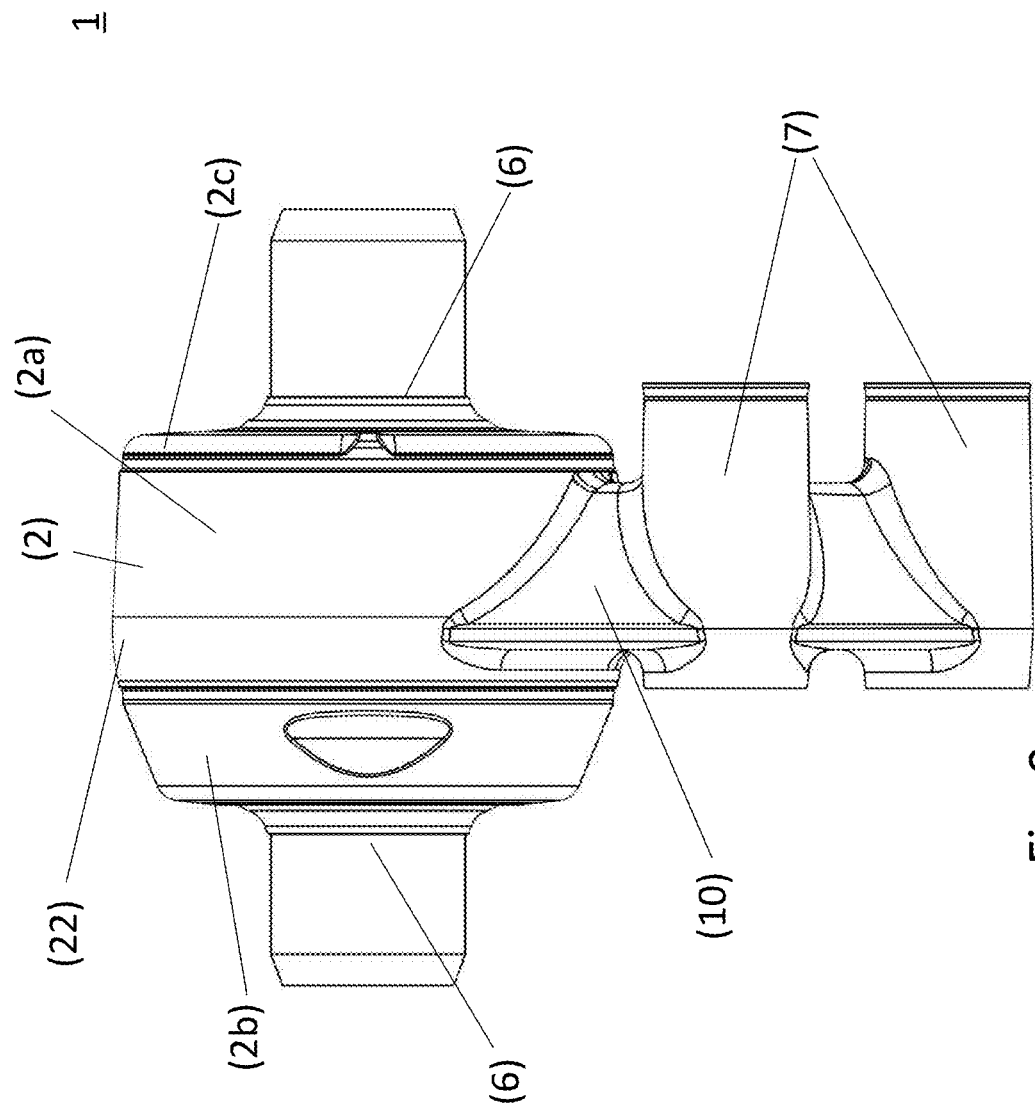
FIG. 9 discloses a side view of an embodiment of a bearing housing where a shaft enters through the bearing housing.

FIG. 9 shows a hygienic bearing housing (1) according to the present invention. The bearing housing (1) comprises a bearing housing body (2) for holding a rotating shaft (11), and 4 bearing housing feet (7) for attaching the bearing housing (1) to a base. Each of the four bearing housing feet (7) extends from the bearing housing body (2) by the means of an arm (10).

The bearing housing body (2) may comprise a fixed bearing housing body (2a), a removable bearing housing cover (2b); and a removable flat cover (2c), wherein the removable flat cover (2c) comprising a shaft insertion for inserting the shaft (11) and wherein the removable bearing housing cover (2b) comprising a shaft insertion (6) for inserting the shaft (11).

Such construction of the bearing housing (1) as shown in FIG. 9 according to the present invention may be provided for bearing housings where the shaft goes through the bearing housing and thus are provided with two shaft insertions (6), one shaft insertions (6) for entering the shaft (11) into the bearing housing (1) and one for exiting the shaft (11) from the bearing housing (1).

Figure 10:
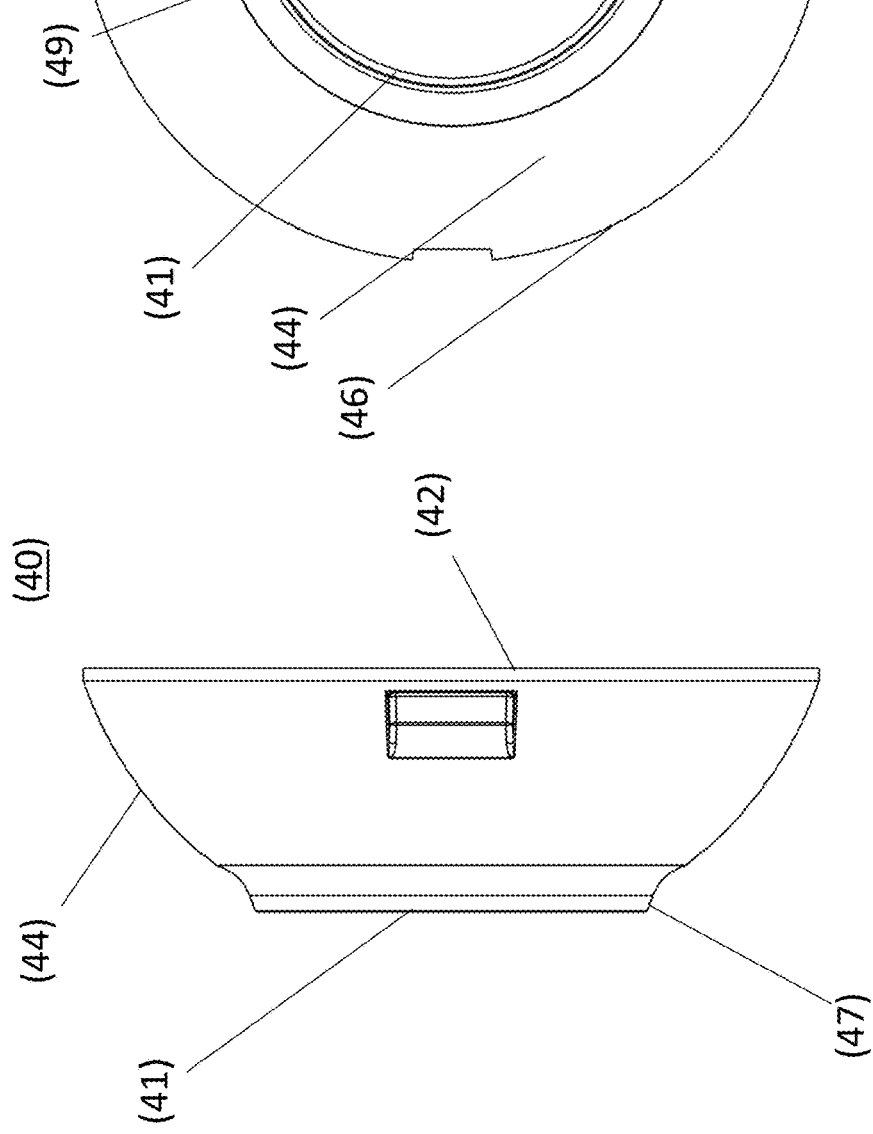
FIG. 10 discloses a side view of a sealing member according to the invention.

FIG. 10 shows a side-view of the sleeve (40) according to the present invention. The sleeve (40) comprise a circular front-end (41) and a circular back-end (42), and a circular opening (6) going through a centre of the circular front-end (41) and the circular back-end (42) wherein the circular back-end (42) is connected to the circular front-end (41) by a spherical structure (44). The circular opening (6) may be going through the sleeve (40), from the circular front-end (41) to the circular back-end (42).

The sleeve (40) may be a slide bearing and/or a seal, such as a spherical seal. The sleeve (40) may be provided in a one-piece material.

The sleeve (40) comprises a diameter of the circular front-end (41) may be smaller than a diameter of the circular back-end (42).

The circular front-end (41) may have a front-end circular opening (45) and the circular back-end (42) may have a back-end circular opening (46), wherein the diameter of the front-end circular opening (45) may be smaller than the back-end circular opening (46).

The front-end circular opening (45) may be provided with a lip seal (47). The lip seal (47) may have a negative or neutral, curvature construction (48), relative to the sleeve (40). The negative, or neutral, curvature construction (48) provided by the lip seal (47) may be negative curvature relative to the spherical structure (44). The negative, or neutral, curvature construction (48) forms a lip seal 47) parallel, or substantially parallel, to the longitudinal direction of a shaft (11, FIG. 11 or 12) when inserted into the circular opening (49), acting as a shaft insertion (6) for inserting a shaft into the bearing housing (1).

Figure 11:
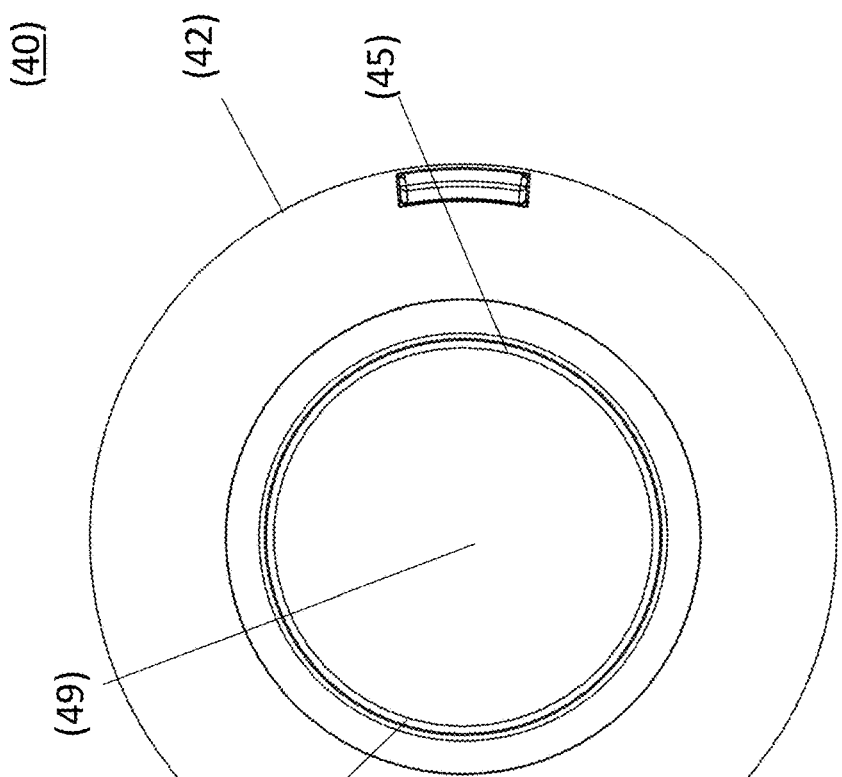
FIG. 11 discloses a front view of same sealing member as FIG. 10.

FIG. 11 shows a front-view of the sleeve (40) as shown in FIG. 10. The sleeve (40) comprises a circular front-end (41) and a circular back-end (42), and a circular opening (49)

going through a centre of the circular front-end (41) and the circular back-end (42) wherein the circular back-end (42) is connected to the circular front-end (41) by a spherical structure (44). The circular opening (49) may be going through the sleeve (40), from the circular front-end (41) to the circular back-end (42).

The circular front-end (41) may have a front-end circular opening (45) and the circular back-end (42) may have a back-end circular opening (46), wherein the diameter of the front-end circular opening (45) may be smaller than the back-end circular opening (46).

In a non-limiting configuration, the shield and/or the sleeve (40) comprises anti-rotating means, which ensures that the shield and/or the sleeve (40) does not rotate together with the rotation of the shaft but allows the bearing and the shield and/or the sleeve (40) according to the present invention to perform angular movements. The anti-rotating means may fix, or substantially fix, rotation of the shield and/or the sleeve (40) relative to the removal flat cover, the bearing house body and/or the bearing house cover.

The shield and/or the sleeve (40) according to the present invention may comprise anti-rotating means. The anti-rotating means according to the present invention may be provided to ensure that the spherical sealing of the shield and/or the sleeve (40) does not rotate together with the rotation of the shaft when inserted into the bearing house. The anti-rotating means can be formed as a complementing combination of a depression (50*a*) and a protrusion (50*b*).

The depression (50*a*) may be found in one of the shield and/or sleeve (40); or the removal flat cover and/or the bearing house cover. Likewise, the protrusion (50*b*) may be found in the other one of the shield and/or sleeve (40); or the removal flat cover and/or the bearing house cover, thereby preventing relative rotation.

FIG. 12 shows the interaction between the sleeve (40), the shaft (11) and the bearing (3). The sleeve (40) comprises a circular front-end (41) and a circular back-end (42), and a circular opening (49) going through a centre of the circular front-end (41) and the circular back-end (42) wherein the circular back-end (42) is connected to the circular front-end (41) by a spherical structure (44). The circular opening (49) may be going through the sleeve (40), from the circular front-end (41) to the circular back-end (42) and a shaft 11 is inserted herein. The FIG. 11 shows that the sleeve (40) rests on the bearing (3) and together the sleeve (40) and the bearing (3) may form a spherical ball or a spherical half-ball with a common spherical centre.

FIG. 13 shows an explosion view of the hygienic bearing housing (1) according to the present invention comprising a sleeve (40).

The hygienic bearing housing (1) comprising a bearing body (2) for holding a bearing (3); and a sleeve (40) forming a shaft insertion (6) (provided by the circular opening (49)) for inserting a shaft (11) into the bearing housing (1), the sleeve (40) is formed with a circular front-end, having a front-end circular opening (45) and a circular back-end having a back-end circular opening (46) forming a circular opening (49) going through a centre of the circular front-end and the circular back-end and the diameter of the front-end circular opening (45) may be smaller than the back-end circular opening (46). The sleeve (40) is movable in contact with the bearing housing body (2) and the sleeve (40) rests on the bearing (3) when installed in the bearing housing body (2). The sleeve (40) may be a seal between the bearing housing body (2) and the shaft (11) and a slide bearing against the shaft (11).

The spherical structure (44) of the outside surface of the sleeve (40) may be in contact with a removable flat cover (2*c*) which is attached to a fixed bearing housing body (2*a*). When a bearing (3) is installed in the bearing housing body (2) the removable flat cover (2*c*) presses the sleeve (40) against the bearing (3).

The sleeve (40) rests on the bearing (3) and the combined bearing (3) and the sleeve (40) may form a spherical structure, such as a ball or a half-ball like structure having the same spherical centre. The combined bearing (3) and the sleeve (40) is movable in contact with the bearing housing body (2) and the shaft (11) is capable of angular movement. around the spherical centre of the sleeve (40) following a movement around a structure like a cone starting from the spherical centre. In addition to the angular movement of the shaft (11) when inserted into the bearing housing (1), the shaft (11) may perform a rotation movement. The rotation movement may be performed around a longitudinal direction of the shaft or around the centreline of the shaft, starting from the spherical centre.

The bearing housing (1) according to the present invention is attached using attachment means (8), such as bolts, to a base (5) at the base end of the bearing feet (7*b*), which are the only parts of the bearing housing which is in contact with the base (5) when the bearing housing (1) is attached to the base (5).

The present invention will now be described in more detail in the following.

Bearing housings are often one of the places in a hygienic environment, such as a food production site, a feed production site or a pharmaceutical site, where dirt, grime, microbial material (such as bacteria or fungus), or other fouling materials, such as allergens, may hide and accumulate resulting in contaminated products with undesirable components.

Accordingly, the inventors of the present invention surprisingly found that simplifying and rebuilding the bearing housing by ensuring it being waterproof, even at increased angular movements when misaligned during installation, cleaning on and around the bearing housing may be much easier and the incidence of deposits or accumulation of dirt, grime, microbial material, or allergens, on, in or around the bearing housing, may be significantly reduced or even avoided, and at the same time without compromising strength, robustness or stability of the bearing housing.

Thus, a preferred embodiment of the present invention relates to a bearing housing comprising a bearing body for holding a bearing; and a sealing member forming a shaft insertion for inserting a shaft into the bearing housing, the sealing member is formed with a spherical outer surface which is movable in contact with the bearing housing body and the sealing member rests on the bearing when installed in the bearing housing body.

The spherical form of the sealing member may encircle the shaft insertion.

In an embodiment of the present invention the sealing member may comprise a sleeve according to the present invention.

In a further embodiment of the present invention the sealing member and/or the sleeve forms a shell around the shaft. Preferably, the shell according to the present invention is a hollow shell. The hollow shell according to the present invention preferably, provides an empty space between the sealing member and/or the sleeve and the shaft. In an embodiment of the present invention the shell, in particular the hollow shell, does not comprise a solid construction (where there has been made room for only the shaft to be introduced).

The inventor of the present invention found that by applying a sealing member and/or a sleeve in the form of a hollow shell a resilient effect of the sealing member and/or the sleeve may be provided, in particular in the contact point between the sealing member and/or the sleeve and the shaft, and more particular in the contact between the lip of the sealing member and/or the sleeve and the shaft. This resilient effect provides improved hygienic effect of the sealing member and/or the sleeve and the bearing housing comprising the sealing member and/or the sleeve.

Furthermore, using a hollow sealing member and/or sleeve as described in the present invention, allows shaft to go through the bearing housing, and/or allows the user to change the longitudinal orientation of the bearing and the shaft (by about 180°).

In an embodiment of the present invention the circular front-end has a radius which is smaller than a radius of the circular back-end. Preferably, the radius of the circular back-end is at least 10% larger than the circular front-end; e.g. the radius of the circular back-end is at least 20% larger than the circular front-end; such as the radius of the circular back-end is at least 30% larger than the circular front-end; e.g. the radius of the circular back-end is at least 40% larger than the circular front-end; such as the radius of the circular back-end is at least 50% larger than the circular front-end; e.g. the radius of the circular back-end is at least 60% larger than the circular front-end.

A preferred embodiment of the present invention relates to a sleeve comprising a circular front-end and a circular back-end, and a circular opening going through a centre of the circular front-end and the circular back-end wherein the back-end is connected to the front-end by a spherical structure.

The present invention relates to the use of a sleeve comprising a polymer material as a sealing and as a slide bearing. Preferably, the sealing may be a sleeve according to the present invention.

In an embodiment of the present invention the sleeve may be a slide bearing.

In yet an embodiment of the present invention the sealing member and/or the sleeve according to the present invention, may preferably be immobile relative to the rotating shaft. This means that the sealing member and/or the sleeve may not be rotating together with the rotating shaft, in particular the sealing member and/or the sleeve may not be rotating.

In a further embodiment of the present invention the sleeve may be a seal, preferably a spherical sleeve In an embodiment of the present invention the sleeve may be a seal, preferably a spherical sleeve, and a slide bearing.

The sleeve according to the present invention may preferably be provided in a one-piece material.

The circular opening may preferably be going through the sleeve, from the circular front-end to the circular back-end.

In an embodiment of the present invention the sleeve comprises a diameter of the circular front-end which may be smaller than a diameter of the circular back-end.

In an embodiment of the present invention the diameter of the circular front-end may be at least 10% smaller than the diameter of the circular back-end; such as at least 25% smaller; e.g. at least 30% smaller; such as at least 40% smaller; e.g. at least 45% smaller; such as at least 50% smaller; e.g. at least 55% smaller; such as at least 60% smaller; e.g. at least 70% smaller; such as at least 80% smaller; e.g. in the range of 10-80% smaller; such as in the range of 25-70% smaller; e.g. in the range of 40-60% smaller; such as in the range of 45-55% smaller.

The circular front-end may have a front-end circular opening and the circular back-end may have a back-end circular opening, wherein the diameter of the front-end circular opening may be smaller than the back-end circular opening.

In an embodiment of the present invention the front-end circular opening is provided with a lip seal.

The lip seal according to the present invention may preferably provide a resilient contact with a rotating shaft.

The lip seal may have a negative curvature construction or a neutral curvature construction relative to the sleeve.

Preferably, the negative curvature construction or the neutral curvature construction forms a lip seal from the end of the spherical structure and parallel, or substantially parallel, to the longitudinal direction of an shaft when inserted into the circular opening.

In an embodiment of the present invention the sleeve may comprise an organic compound.

In a further embodiment of the present invention the organic compound may comprise an inert organic compound.

The organic compound may be polymer material. Preferably the polymer material comprises an olefin compound. The olefin compound may be formed like a fiber compound. Preferably the olefin compound may comprise polypropylene, polyethylene or a combination of polypropylene and polyethylene.

Preferably the sleeve comprises at least 10% organic compound; such as at least 20%; e.g. at least 30%; such as at least 40%; e.g. at least 50%; such as at least 75%; e.g. at least 80%; such as at least 90%; e.g. at least 95%.

The sleeve comprises less than 30% non-organic material; such as less than 20%; e.g. less than 10%; such as less than 5%; e.g. less than 3%; such as less than 1%.

Non-organic material may include metals, like steel, iron, silicate, or ceramics.

In an embodiment of the present invention the sleeve may comprise a Young modulus (or the modulus of elasticity in tension) in the range of 1000-1500 GPa; such as in the range of 1050-1400 GPa; e.g. in the range of 1100-1200 GPa; such as in the range of 1130-1170 GPa; e.g. in the range of 1140-1160 GPa.

If the Young modulus (or the modulus of elasticity in tension) becomes too low, such as below 1000 GPa, it may be difficult to maintain the shape of the sleeve. If the Young modulus (or the modulus of elasticity in tension) becomes too high, such as above 1500 GPa the desired elasticity of the sleeve may be lost.

Young modulus (or the modulus of elasticity in tension) may relate to a measure of the ability of a material to withstand changes in length when under lengthwise tension or compression In an embodiment of the present invention the sleeve may comprise a coefficient of thermal expansion below $20 \times 10^{-5}$ $K^{-1}$; such as $15 \times 10^{-5}$ $K^{-1}$ or below; e.g. below $13 \times 10^{-5}$ $K^{-1}$; such as $11 \times 10^{-5}$ $K^{-1}$ or below; e.g. below $10 \times 10^{-5}$ $K^{-1}$; such as $8 \times 10^{-5}$ $K^{-1}$ or below; e.g. below $6 \times 10^{-5}$ $K^{-1}$; such as in the range of $2 \times 10^{-5}$ $K^{-1}$-$20 \times 10^{-5}$ $K^{-1}$; e.g. in the range of $5 \times 10^{-5}$ $K^{-1}$-$18 \times 10^{-5}$ $K^{-1}$; such as in the range of $5 \times 10^{-5}$ $K^{-1}$-$15 \times 10^{-5}$ $K^{-1}$; e.g. in the range of $10 \times 10^{-5}$ $K^{-1}$-$12 \times 10^{-5}$ $K^{-1}$.

The coefficient of thermal expansion describes how the size of an object changes with a change in temperature. Specifically, it measures the fractional change in size per degree change in temperature at a constant pressure, such that lower coefficients describe lower propensity for change in size.

In an embodiment the sleeve comprises a moisture absorption less than 1% (w/w); such as less than 0.9% (w/w); e.g. less than 0.8% (w/w); such as less than 0.7% (w/w); e.g. less than 0.6% (w/w); such as less than 0.5% (w/w); e.g. less than 0.4% (w/w); such as less than 0.3% (w/w); e.g. less than 0.2% (w/w); such as less than 0.1% (w/w).

Moisture absorption as used in the present context relates to the capacity of the sleeve to absorb moisture from its environment. Absorbed moisture has been shown to act as a plasticizer, reducing the glass transition temperature and strength of plastic—which is a reversible effect.

In an embodiment of the present invention the sleeve (40) comprises a moisture absorption in the range of 0.01-1% (w/w); such as in the range of 0.02-0.9% (w/w); e.g. in the range of 0.03-0.8% (w/w); such as in the range of 0.04-0.7% (w/w); e.g. in the range of 0.05-0.6% (w/w); such as in the range of 0.06-0.5% (w/w); e.g. in the range of 0.07-0.4% (w/w); such as in the range of 0.08-0.3% (w/w); e.g. less than 0.09-0.2% (w/w); such about 0.1% (w/w)]

In a further embodiment of the present invention the sleeve comprises a max strain of at least 1%; such as at least 2%; e.g. at least 3%; such as at least 4%; e.g. at least 5%.

The max strain of the sleeve may relate to the maximum stress necessary in order to provide permanent or irreversible deformation of the sleeve.

In an embodiment of the present invention the sleeve may, when subjected to a constant stress resulting in a strain of 2%, at 20° C. for at most 6 hours, provide at most 50% extension relative to the stain of 2%, such as at most 30%; such as at most 25%; e.g. at most 20%. Preferably, the sleeve may within 7 days in relax from the stress applied resume to at most 1% extension relative to the stain of 2%, such as at most 0.75%; such as at most 0.5%; e.g. at most 0.25%.

Correct adjustment of the max stain may significantly influence and improve durability of the sleeve.

In an embodiment of the present invention the sleeve may comprise a coefficient of friction (determined against steel) in the range of 0.005-0.4, such as in the range of 0.01-0.3; e.g. in the range of 0.05-0.25; such as in the range of 0.075-0.2; e.g. in the range of 0.09-0.19.

Preferably, the sleeve comprises a coefficient of friction (determined against steel) which is below 0.4, such as below 0.3; e.g. below 0.25; such as below 0.2; e.g. below 0.19.

In the context of the present invention the term "coefficient of friction" depends on the material against which the friction may be created. Preferably, the "coefficient of friction" according to the present invention may be determined as the material against steel.

The coefficient of friction may be defined by the friction between the sleeve and an shaft (preferably an shaft of steel) when inserted into the circular opening. The coefficient of friction may be the ratio defining the force that resists the motion of one body in relation to another body in contact with it. This ratio may be dependent on material properties and may have a value between 0 and 1.

In an embodiment of the present invention the sleeve may be a sleeve. Preferably the sleeve may be a self-supporting sleeve.

In the context of the present invention the term "self-supporting" relates to a sleeve that is not immobilised by, or hold in place by, external means. Thus, in an embodiment of the present invention the sleeve does not comprise means external means, like straps, e.g. metal straps. Thus, the sleeve may be a self-supporting spherical seal and a slide bearing.

In an embodiment of the present invention the sleeve may provide a sealing towards an shaft when the shaft may be inserted into the sleeve. Additionally, the sleeve may provide a sealing towards the flat cover.

In an embodiment of the present invention the bearing comprises a spherical outer surface of the outer ring.

The radius of the spherical outer surface of the outer ring of the bearing may be the same, or substantially the same, as the radius of the spherical structure of the sleeve according to the present invention and/or of the sealing member according to the present invention.

In the present context the term "substantially the same" relates to a deviation of 10% or less, such as a deviation of 5% or less, e.g. a deviation of 2% or less; such as a deviation of 1% or less.

In a further embodiment of the present invention the bearing (when installed in the bearing housing) comprises a spherical outer surface of the outer ring. Preferably, this spherical structure of the outer surface of the outer ring of the bearing may improve the contact and the ball-like or part ball-like structure of the combination of the bearing and the sealing member.

In yet an embodiment of the present invention the sealing member rests on the bearing and together the sealing member and the bearing may form a spherical ball or a spherical half-ball with a common spherical centre.

The bearing housing may in some embodiments be described with a bearing installed in the bearing housing body. The description of other embodiments of the present invention provided without a bearing installed in the bearing housing body and may be considered if a bearing was installed in the bearing housing body or how the construction may be may be done when a bearing subsequently is installed in the bearing housing body.

In the event the bearing housing body does not (directly) describe the combination of a bearing housing body with a bearing installed in the bearing housing body, the bearing may subsequently be installed in the bearing housing body. Installation of the bearing in the bearing housing body may be done at any time from acquiring the bearing housing and until after attaching the bearing housing to a base.

In an embodiment of the present invention the bearing housing according to the present invention may comprise a bearing installed in the bearing housing body.

The bearing installed in the bearing housing may be a steel ball-bearing; a ceramic bearing; a slide bearing; or a roller bearing.

In a further embodiment of the present invention the bearing housing according to the present invention may comprise a bearing which may be installed in the bearing housing body, and the bearing may be immovable, or substantially immovable, relative to the sealing member.

In another embodiment of the present invention the bearing (when installed in the bearing housing body) and/or the sealing member may be movable in contact with the bearing housing body.

In an embodiment of the present invention the sealing member may be a spherical sealing.

In another embodiment of the present invention the sealing member and/or the sleeve does not comprise a separate sealing, such as an O-ring, between the sealing member and/or the sleeve and the shaft.

The sealing member and/or the sleeve according to the present invention may comprise anti-rotating means. The anti-rotating means according to the present invention may be provided to ensure that the spherical sealing of the sealing member and/or the sleeve does not rotate together with the rotation of the shaft when inserted into the bearing housing.

In an embodiment of the present invention the sealing member and/or the sleeve according to the present invention may comprise anti-rotating means. In a further embodiment of the present invention the anti-rotating means ensures that the sealing member and/or the sleeve does not rotate together with the rotation of the shaft but allows the bearing and the sealing member and/or the sleeve according to the present invention to perform angular movements.

The anti-rotating means may fix, or substantially fix, rotation of the sealing member and/or the sleeve relative to the removal flat cover, the bearing housing body and/or the bearing housing cover.

In an embodiment of the present invention the anti-rotating means comprises a complementing combination of a depression and a protrusion.

The depression in may be found in one of:
the sealing member and/or sleeve; or
the removal flat cover and/or the bearing housing cover; and the protrusion may be found in the other one of:
the sealing member and/or sleeve; or
the removal flat cover and/or the bearing housing cover.

The bearing (when installed in the bearing housing body) and/or the sealing member may be movable in contact with the removal flat cover.

In another embodiment of the present invention the bearing (when installed in the bearing housing body) may be movable in contact with the bearing housing body. The sealing member may be movable in contact with the bearing housing body. Preferably, the bearing and the sealing member may be movable in contact with the bearing housing body.

In yet an embodiment of the present invention the sealing member may be immovable, or substantially immovable, relative to the shaft when inserted into the bearing housing and/or relative to the shaft when inserted into the bearing via the shaft insertion.

In the context of the present invention the terms "shaft" and "rotating shaft" may be used interchangeably and relates to the shaft inserted, or to be inserted, into the bearing housing, via the shaft insertion and into the bearing.

In an embodiment of the present invention the sealing member may comprise a slide bearing. Preferably the slide bearing of the sealing member may be turned toward the shaft, when inserted into the bearing housing, via the shaft insertion and into the bearing.

In another embodiment of the present invention the bearing housing according to the present invention may comprise a bearing which may be installed in the bearing housing body, and the bearing may be immovable relative to the shaft when the shaft is inserted into the bearing housing. Preferably, the shaft, when inserted into the bearing housing via the shaft insertion, is fixed to the bearing.

The term "when the shaft is inserted into the bearing housing" may relate to a construction of the bearing housing without a bearing installed, but how the bearing housing would be like when the gearing may be installed in the bearing housing body.

In an embodiment of the present invention the sealing member may comprise a seal between the bearing housing body and the sealing member.

The sealing member may comprise a first circular opening facing the outside of the bearing housing. The first circular opening may preferably be in contact with the shaft when inserted into the bearing housing, via the shaft insertion and into the bearing.

The sealing member may comprise a radius of the first circular opening which may surround tightly around the shaft when inserted into the bearing housing, via the shaft insertion and into the bearing.

In a preferred embodiment of the present invention the first circular opening of the sealing member may be provided with a sealing.

The inventors of the present invention surprisingly found that by constructing the bearing housing with a spherical outer surface of the sealing member, and a sealing member which rests on a bearing having a spherical outer surface of the outer ring an increased angular movement of the sealing member (and/or the bearing when installed in the bearing housing body and/or the shaft when inserted into the bearing housing body and into the bearing) may be provided.

This construction of the bearing housing according to the present invention may lead to less stress of the bearing and/or avoiding undesirable deformation of the seals. In this way waterproof properties of the bearing housing and durability of the bearing may be significantly improved, and maintenance of the bearing may be significantly reduced and lubrication may be avoided.

Thus, in an embodiment of the present invention the sealing member and/or the sealing member and the bearing may be capable of angular movement.

The angular movement may be a movement around a centre, such as a centre of the spherically formed sealing member.

In an embodiment of the present invention the centre of the sealing member may be the centre of a sphere from which the sealing member constitutes a specific part.

The angular movement may preferably a movement around a centre line of a cone. The centre line of the cone may extend from the spherical centre of a sphere which may be formed, partly, by the combination of the sealing member when resting on the bearing and along the shaft in the direction out of the bearing housing body through the shaft insertion.

In addition to the angular movement of the shaft when inserted into the bearing housing, the shaft may perform a rotation movement. The rotation movement may be performed around a longitudinal direction of the shaft, i.e. around the centreline of the shaft.

Prior art bearing housings may allow small angular movements or small misalignments of the shaft in angular direction with respect to the bearing housing. However, in order to maintain a waterproof and a hygienic construction of the bearing housing, prior art bearing housings may allow maximum angular movements or misalignments of about 1.5 degrees, without affecting seal performance and resulting in a leaky bearing housing allowing water to enter the bearing housing and increasing the risk of deposit or accumulation of dirt, grime, microbial material, or allergens in the bearing housing. This limitation to the misalignment may be due to the construction of the bearing housing and/or the immobile or fixed position of the bearing inside the bearing housing.

Misalignments causing angular movement of the shaft when inserted into a bearing housing may be caused by an angular misalignment of connected bearing housings and/or a parallel misalignment of connected bearing housings.

In a preferred embodiment of the present invention the sealing member and/or the sealing member and the bearing may be capable of angular movement above 1.5 degrees without compromising seal performance; such as an angular movement of 1.75 degrees or more; e.g. 2 degrees or more; such as 2.5 degrees or more; e.g. 3 degrees or more; such as 3.5 degrees or more; e.g. 4 degrees or more; such as 4.5 degrees or more; e.g. 5 degrees or more; such as 6 degrees or more; e.g. 7 degrees or more; such as 8 degrees or more; e.g. 9 degrees or more; such as 10 degrees or more; e.g. in the range of 1.75-20 degrees; such as the range of 2-18 degrees; e.g. in the range of 3-17 degrees; such as the range of 4-16 degrees; e.g. in the range of 5-15 degrees; such as the range of 6-14 degrees; e.g. in the range of 7-13 degrees; such as the range of 8-12 degrees.

In the context of the present invention the term "seal performance" relates to the ability of the bearing housing to remain waterproof and avoid water to enter the bearing housing and avoid dirt, grime, microbial material, or allergens to enter and growth in the bearing housing. Maintaining the seal performance may also lead to less stress of the bearing and/or avoiding undesirable deformation of the seal between the bearing housing body and the sealing member and/or the seal provided on the first circular opening (between the sealing member and the shaft, when inserted into the bearing housing body). In this way the bearing housing may remain waterproof and durability of the bearing may be significantly improved, and/or maintenance may be significantly reduced.

If the bearing housing becomes leaky and water enters the bearing housing and/or when dirt, grime, microbial material, or allergens to enters the bearing housing there is a need for additional lubrication to avoid water to enter, and thorough extensive cleaning is needed to avoid deposit or accumulation of dirt, grime, microbial material, or allergens in the bearing housing and the risk of contamination of the hygienic environment may be significantly increased. Furthermore, in addition to handling leakage of water into the bearing housing by lubrication to avoid water in the bearing housing, lubrication may also cause additional maintenance and wear of the bearing which results in increased downtime of the process line and increased costs for material and manpower, in addition to increased risk deposit or accumulation of dirt, grime, microbial material, or allergens in the bearing housing.

In an embodiment of the present invention the bearing housing body comprises a fixed bearing housing body, and a removable bearing housing cover attached to the fixed bearing housing body. Preferably, the bearing housing body comprises a fixed bearing housing body connected with the two or more bearing housing feet via the arm, and a removable bearing housing cover attached to the fixed bearing housing body.

In another embodiment of the present invention the bearing housing body comprises a fixed bearing housing body, and a removable flat cover being in contact with the sealing member and comprising the shaft insertion. Preferably, the bearing housing body comprises a fixed bearing housing body connected with the two or more bearing housing feet via the arm, and a removable flat cover being in contact with the sealing member and comprising the shaft insertion.

In yet an embodiment of the present invention the bearing housing body comprises a fixed bearing housing body, and a removable bearing housing cover attached to the fixed bearing housing body and wherein the bearing housing body comprises a fixed bearing housing body, and a removable flat cover being in contact with the sealing member and comprising the shaft insertion. Preferably, the bearing housing body comprises a fixed bearing housing body connected with the two or more bearing housing feet via the arm, and a removable bearing housing cover attached to the fixed bearing housing body and a removable flat cover being in contact with the sealing member and comprising the shaft insertion.

The removable flat cover may be attached to the fixed bearing housing body, on the opposite side of the fixed bearing housing body relative to the removable bearing housing cover.

In an embodiment of the present invention the bearing housing body may comprise a fixed bearing housing body, a removable bearing housing cover; and a removable flat cover, wherein the removable flat cover comprising a shaft insertion for inserting the shaft and wherein the removable bearing housing cover comprising a shaft insertion for inserting the shaft. Such construction of the bearing housing according to the present invention may be provided for bearing housings where the shaft goes through the housing and thus two shaft insertions are needed, one shaft insertions for entering the shaft into the bearing housing and one for exiting the shaft from the bearing housing.

The circular structure of the outside surface of the sealing member may be in contact with a removable flat cover which is attached to a fixed bearing housing body. When a bearing is installed in the bearing housing body the removable flat cover presses the sealing member against the bearing. The removable flat cover may be in contact with the sealing member and a sealing is provide between the removable flat cover and the sealing member. The removable flat cover may also comprise a seal between the removable flat cover and the fixed bearing housing body. Preferably, the seal between the removable flat cover and the fixed bearing housing body may be configured with contours, which are adapted to the surfaces of the removable flat cover and the fixed bearing housing body and thereby substantially ensure continuous surfaces of the removable flat cover and the fixed bearing housing body.

In the event the bearing housing may be provided with a fixed bearing housing body and a flat cover, a seal may be provided between the fixed bearing housing body and the flat cover.

In the event the bearing housing may be provided with a fixed bearing housing body and a removable bearing housing cover a seal may be provided between the fixed bearing housing body and the removable bearing housing cover. Preferably, the seal between the fixed bearing housing body and the removable bearing housing cover may be configured with contours, which are adapted to the surfaces of the fixed bearing housing body and the removable bearing housing cover and thereby substantially ensure continuous surfaces of the fixed bearing housing body and the removable bearing housing cover.

In a preferred embodiment of the present invention a bearing may be installed inside the bearing housing body. The bearing installed in the bearing housing may be a steel ball-bearing; a ceramic bearing; a slide bearing; or a roller bearing.

In a further preferred embodiment of the present invention the bearing housing may be a hygienic bearing housing.

In an embodiment of the present invention the bearing housing body may comprise at least one attachment means for attaching the bearing housing to a base, preferable the bearing housing body may comprise at least two attachment means for attaching the bearing housing to a base.

Preferably, the at least one, preferably at least two, attachment means for attaching the bearing housing to the base may be one or more bearing housing feet for attaching the bearing housing to the base, preferably, two or more bearing housing feet for attaching the bearing housing to the base. Each of the one or more, preferably two or more, bearing housing feet may extend from the bearing housing body by the means of a arm.

In addition to the unique construction of the bearing housing of the present invention provided to solve the problem of misalignment of corresponding bearing housings by allowing larger angular movement, the inventors of the present invention also found that by simplifying and rebuilding the bearing housing, cleaning in, on and around the bearing housing may be much easier and the incidence of deposits or accumulation of dirt, grime, microbial material, or allergens, on, in or around the bearing housing, may be significantly reduced or even avoided, and at the same time without compromising strength, robustness or stability of the bearing housing.

Thus, a preferred embodiment of the present invention relates to a bearing housing comprising a bearing housing body for receiving a rotating shaft, and one or more, preferably two or more, bearing housing feet for attaching the bearing housing to a base, wherein each of the one or more, preferably two or more, bearing housing feet extends from the bearing housing body by the means of an arm.

In the context of the present invention the term "attaching" relates to the fixation of one element to another element. In an embodiment of the present invention the term "attaching the bearing housing to a base" relates to the fixation of the bearing housing to the base making it immobile or substantially immobile.

The bearing housing may be mounted in a vertical position or in a horizontal position to the base, depending on the application and/or the location of the bearing housing.

One of the unique features of the bearing housing according to the present invention may be the projection of the one or more bearing housing feet next to the bearing housing body by introducing an arm between each of the one or more, preferably two or more, bearing housing feet and the bearing housing body. In the present context the term "extend from" relates to stretching out one or more bearing housing feet from the bearing housing body. Preferably, the one or more bearing housing feet are extended from or stretched out from the bearing housing and separated by an arm.

In an embodiment of the present invention the arm may be used for extending the bearing housing feet from the bearing housing body and between one or more bearing housing feet. If three or more, or four or more bearing housing feet are connected to each other, one or more bearing housing feet may be attached to the bearing housing body via another bearing housing foot.

In the present context the term "arm" relates to a piece of material used to create or maintain a space between two elements, in particular between each of the one or more, preferably two or more, bearing housing feet and the bearing housing body and/or between individual bearing housing feet. The arm according to the present invention may be constructed to improve and/or ease cleaning in, on or around the bearing housing and at the same time to provide strength and stability to the bearing housing.

In an embodiment of the present invention the arm may be made of the same material as the material used in the one or more bearing housing feet and/or in the bearing housing body.

In another embodiment of the present invention the arm may be made of a different material than the material used in the one or more bearing housing feet and/or in the bearing housing body.

In an embodiment of the present invention the bearing housing comprise 1 or more bearing housing feet each extending from the bearing housing body by the means of a arm, such as 2 or more bearing housing feet, e.g. 3 or more bearing housing feet, such as 4 or more bearing housing feet, e.g. 5 or more bearing housing feet, such as 6 or more bearing housing feet, e.g. 8 or more bearing housing feet.

In a preferred embodiment of the present invention the bearing housing comprises 2-4 bearing housing feet, which each extending from the bearing housing body by the means of a arm.

In a further embodiment of the present invention the bearing housing feet may involve a flange.

The bearing housing feet or the flange may be fitted with attachment means. The attachment means may include nuts and bolts where the bolt is going through the bearing housing feet or the flange, preferably in longitudinal direction relative to the direction of the bearing housing feet or the flange, and through the base.

In an embodiment of the present invention each of the one or more bearing housing feet may comprises attachment means for attaching the bearing housing to the base.

In a further embodiment of the present invention the base may be a part of a machine, a device, an equipment, or the like.

The inventors of the present invention surprisingly found that by reducing the amount of material being in contact with the base, areas or spots available for dirt, grime, microbial material and/or other fouling materials to hide and accumulate may be significantly reduced and/or by reconstructing the bearing housing it has become easier to clean in, on and around the bearing housing with easy access for cleaning from all angles around the bearing housing. This improved construction surprisingly makes wash-down and cleaning more efficient and/or more reliable resulting in the above-mentioned reductions.

In an embodiment of the present invention the one or more bearing housing feet may be the only part of the bearing housing which is in contact with the base.

In a further embodiment of the present invention the bearing housing body and/or the arm is/are not in contact with the base.

In this situation, where the one or more bearing housing feet may be the only part of the bearing housing which is in contact with the base and/or where the bearing housing body and/or the arm is/are not in contact with the base, an open space is left between the part of the bearing housing not in contact with the base (e.g. the bearing housing body and/or the arm) and the base. Preferably, the open space between the bearing housing body and the base, and/or the open space between the arm and the base, is more than 1 mm, such as more than 3 mm, e.g. more than 5 mm, such as more than 1 cm, e.g. more than 1.5 mm, such as more than 2.5 mm, such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the bearing housing body may comprise at least two contact points with a base. The contact points may preferably be visual contact points. Preferably the contact points of the bearing housing with the base may be provided by the at least two feet.

In an embodiment of the present invention the length of the one or more bearing housing feet may be in the direction substantially longitudinal to the opening for receiving the rotating shaft.

In a further embodiment of the present invention the length of the one or more bearing housing feet may be in the direction substantially perpendicular to the direction of the base where the bearing housing may be mounted.

In an embodiment of the present invention the one or more bearing housing feet may be further extended to make an additional distance between the bearing housing body and the base. The further extension of the one or more bearing housing feet may be provided by introducing feet-spacers to each of the one or more bearing housing feet until the desired length has been reached. Preferably, a seal may be placed between each of the feet-spacers and each of the one or more bearing housing feet. Preferably, a seal is placed between each of the feet-spacers and the base.

In an embodiment of the present invention the one or more bearing housing feet may be further extended to make an additional distance between the bearing housing body and the base. The further extension of the one or more bearing housing feet may be provided by introducing feet-spacers to each of the one or more bearing housing feet until the desired length has been reached. Preferably, a seal may be placed between each of the feet-spacers and each of the one or more bearing housing feet. Preferably, a seal may be placed between each of the feet-spacers and the base.

Misalignment between corresponding bearing housings occurs. Hence, terms like "substantially perpendicular" and/or "substantially longitudinal" of bearing housings may be subjected to a deviation between 0-20° and still be considered within the range covered by substantially longitudinal direction, or within the range covered by substantially perpendicular, without compromising the hygiene safety, strength or stability; such as between 2°-17°, e.g. between 3°-15°, such as between 4°-12°, e.g. between 5°-11°, such as between 6°-10°.

The inventors of the present invention have found that by reducing the amount of material used when constructing the bearing housing cleaning around the bearing housing and cleaning from various angles around the bearing housing was much easier and significantly more efficient and/or more reliable resulting in a limitation or even avoiding deposit or accumulation of dirt, grime, microbial material, or allergens, on, in or around the bearing housing would be advantageous.

The inventors of the present invention surprisingly found that in particular the amount of material use for constructing the part between the bearing housing body and the two or more bearing housing feet may be reduced. The inventors of the present invention surprisingly found that by replacing this part of the bearing housing (the part between the bearing housing body and each of the two or more bearing housing feet) may be replaced with a arm according to the present invention without compromising the strength, robustness or stability of the bearing housing.

The arm according to the present invention may have:
a length (l) determining how far each of the one or more bearing housing feet extend from the bearing housing body. Preferably, each of the arms may have the same length (l);
a height (h) determined in the direction from the bearing housing to the base. Preferably, each of the arms may have the same height (h);
a width (w) determined in the direction perpendicular to the direction from the bearing housing to the base. Preferably, each of the arms may have the same height (h).

In an embodiment of the present invention the one or more bearing housing feet may have a length which is larger (determined from the top of the bearing feet to the base) than the height of the arm.

By constructing the bearing housing with the one or more bearing housing feet having a length which may be larger than the height of the arm an open space may be provided between the arm and the base. This open space may improve and ease cleaning in, on and around the bearing housing and also easier cleaning from various angles of the bearing housing, bearing housing body, the fixed bearing housing body, and/or the one or more bearing housing feet.

In an embodiment of the present invention the arm may be placed relative to the base and/or the one or more bearing housing feet to provide an open space between the arm and the base.

Preferably, the open space between the arm and the base is more than 1 mm, such as more than 3 mm, e.g. more than 5 mm, such as more than 1 cm, e.g. more than 1.5 mm, such as more than 2.5 mm; such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the width of one or arm may be equal to or smaller than the width of the two or more bearing housing feet.

The construction according to the present invention, relative to prior art construction of bearing housings, may involve removal of material around the two or more bearing housing feet and/or removal of material between the two or more bearing housing feet and the bearing housing body and the individual elements (such as the two or more bearing housing feet; the bearing housing body; and/or the arm, may be easily differentiated.

In an embodiment of the present invention the arm may be easily distinct from the one or more bearing housing feet.

In a further embodiment of the present invention the arm may be easily distinct from the bearing housing body.

In an even further embodiment of the present invention the one or more bearing housing feet may be easily distinct from the bearing housing body In the present context the term "easily distinct" relates to a clear difference between the elements of the bearing housing, such as a difference between the bearing housing body and the one or more bearing housing feet; between the one or more bearing housing feet and the arm; and/or between the bearing housing body and the arm). In an embodiment of the present invention the difference may be a visual differentiation.

In an embodiment of the present invention the fixed bearing housing body, the arm and the one or more bearing housing feet may be produced, e.g. by moulding, preferably moulded in one piece.

As mentioned above the construction, the design and/or the fabrication of the arm may assist in improving the cleaning and the arm according to the present invention may improve drainage, such as being able to self-drain liquids, such as aqueous suspension, e.g. an aqueous cleaning solution. By making cleaning easier and more effective, and by introducing easy draining, or even self-draining surfaces of the bearing housing, and in particular the arm, the incidence and/or risk of hiding or accumulation of dirt, microbial material or other contaminating material may be reduced or even avoided.

In an embodiment of the present invention the arm may be formed as a polyhedron, such as a triangular prism; a square prism; a pentagonal prism; or a hexagonal prism. Preferably, the arm may be formed as a triangular prism.

In another embodiment of the present invention the polyhedron may be a frustum. In the context of the present invention the term "frustum" relates to a structure topologically identical to a prism, with trapezoid lateral faces and different sized top and bottom polygons.

In an embodiment of the present invention the arm comprises a first curvature end aligned with the radius of the bearing housing body and a second curvature end aligned with the radius of the bearing housing feet. Preferably, the radius of the first curvature end is larger than the radius of the second curvature end.

In an embodiment of the present invention the term "curvature end" relates to an end that has aligned and adapted to the surface that the end is attached.

The triangular prism may comprise three rectangular parts and two triangular ends, preferably the two triangular ends have dissimilar dimensions. In an embodiment of the present invention the triangular end being connected to the bearing housing has a radius which is larger than the radius of the triangular end being connection to one of the two or more bearing housing feet.

In an embodiment of the present invention the first end of the two triangular ends may be attached to the bearing housing body and the second end of the two triangular parts may be attached to one of the two or more bearing housing feet.

The arm may take different forms depending and shapes and at least one edge of the polyhedron, e.g. of the triangular prism, may be straight shaped, concave shaped or convex shaped.

The at least one edge of the polyhedron, e.g. of the triangular prism, may be concave shaped and at least one length of the edge of the triangular prism may be convex shaped.

In an embodiment of the present invention a tip of the polyhedron, e.g. of the triangular prism, may be pointing towards the base.

In an embodiment of the present invention the term "tip of the polyhedron" relates to one of the edges of the polyhedron, e.g. the triangular prism. Preferably, the one of the edges of the polyhedron, e.g. the triangular prism, is pointing toward the base, preferably directly towards the base.

By the above-mentioned structure of the bearing housing a limited amount of the bearing housing is in contact with the base and/or a larger open space around the bearing housing may be provided allowing an easier and more efficient and/or more reliable cleaning resulting in a limitation or even to avoid deposit or accumulation of dirt, grime, microbial material, or allergens, on, in or around the bearing housing.

For improving maintenance of the bearing housing, the bearing inside the bearing housing during use and/or for ease installation of a beating and/or a shaft in the bearing housing the bearing housing body may be provided in different elements which may be joint forming the bearing housing body.

In an embodiment of the present invention the seal/sealings according to the present invention may preferably be configured with contours which are adapted to the structure of the surfaces connected or elements connected and thereby substantially ensure a continuous or substantially continuous surface in the joints between surfaces or elements connected, such as the joints between the fixed bearing housing body and the removable bearing housing cover; and/or the joints between the two or more bearing housing feet and the base; and/or the joint between the fixed bearing housing body and the flat cover; the joint between the bearing housing and the sealing member; and/or the sealing provided on the first circular opening (being in contact with the shaft when inserted into the bearing housing body).

By means of the seal/sealings according to the present invention, dirt, grime, microbial material (such as bacteria or fungus), or other fouling materials, such as allergens, may be hindered or prevented from entering the gaps or joints between connecting surfaces or elements.

The seal or seals according to the present invention may be prepared from a non-conductive material. The seal, seals or conductive material may be silicone. Preferably, the seal or seals may be prepared from soft silicone. Preferably, the seal has a blue color, preferably RAL 5010, which provides an improved visual inspection of the hygienic level and/or cleaning quality.

In an embodiment of the present invention each of the two or more bearing housing feet may comprise a sealing between each of the two or more bearing housing feet and the base.

The bearing housing may be made of a plastic material or a metal material or a combination hereof. The plastic material may be selected from a polypropylene material. Preferably, the polypropylene material may be a sturdy polypropylene material. The metal material may be stainless steel.

In an embodiment of the present invention all exposed surfaces of the bearing housing may have a smooth finish such that dirt, grime, microbial material (such as bacteria or fungus), or other fouling materials, such as allergens, may be cleaned from the surface Preferably, the bearing housing according to the present invention may be free of joints, pits, folds, cracks, crevices, and other imperfections in the final fabricated form, when installed on the machinery and/or when working within the specified load conditions.

Preferably, none of the exposed surfaces of the bearing housing according to the present invention comprising knurled surfaces.

All the exposed surfaces of the bearing housing according to the present invention may preferably be cleanable.

All the exposed surfaces of the bearing housing according to the present invention may preferably be inspectable.

In the context of the present invention the terms "surface" and "exposed surface" may be used interchangeably and relates to any surface that may be accessible to dirt, grime, microbial material (such as bacteria or fungus), or other fouling materials, such as allergens.

In an embodiment of the present invention all the exposed surfaces of the bearing housing according to the present invention may be self-draining. In a further embodiment of the present invention the bearing housing comprises no surfaces which has one or more pockets which may retain liquids.

In the context of the present invention, the term "self-draining" relates to a surface constructed, designed and/or fabricated in a manner allowing aqueous suspension, such as aqueous cleaning suspension, like water, to escape and/or leaving the surface.

In a preferred embodiment cleaning of the bearing housing may be by manual cleaning. During manual cleaning, removal of dirt, grime, microbial material, or other fouling materials may be affected by an aqueous suspension, e.g. chemical and/or water rinses, optionally with the assistance of one or a combination of brushes, nonmetallic scouring pads and scrapers. Rinses may be performed by high- or low-pressure hoses, and/or with cleaning aids manipulated by hand.

In order to limit accumulation and/or growth of dirt, grime, microbial material or other fouling materials on the exposed surfaces of the bearing housing and to improve drainage of aqueous suspension, e.g. water, from the surface, the surface of the bearing housing may be a smooth surface.

In an embodiment of the present invention the surface of the bearing housing may be smooth. Preferably, the smooth surface of the bearing housing may allow drainage, preferably self-drainage, of liquids from the surface.

Smoothness of the exposed surface of the bearing housing according to the present invention may be determined by the "Roughness Average (Ra)". Roughness Average or Ra is an arithmetical mean of the absolute values of the surface profile departure within a sampling length. In the context of the present invention the roughness (Ra) of the surface of the bearing housing may be determined according to the ISO 4287:1997 standard.

Preferably the surface of the bearing housing according to the present invention may comprise all the exposed surfaces of the bearing housing.

The surface of the bearing housing may have a roughness below Ra 2.0 µm; such as Ra 1.8 µm; e.g. Ra 1.6 µm; such as Ra 1.4 µm; e.g. Ra 1.2 µm; such as Ra 1.0 µm; e.g. Ra 0.8 µm; such as Ra 0.6 µm; e.g. Ra 0.4 µm.

Preferably, the bearing housing according to the present invention comprises no exposed surfaces; ledges and/or edges which are horizontal.

In an embodiment of the present invention the bearing housing all exposed surfaces; ledges and/or edges are curvilinear or curved.

In order to ensure high drainage effect at least one of the exposed surfaces; ledges and/or edges of the bearing housing, preferably all exposed surfaces; ledges and/or edges, may have an angle, may be founded or has a curvature relative to horizontal.

In an embodiment the present invention at least one of the exposed surfaces; ledges and/or edges of the bearing housing, preferably all exposed surfaces; ledges and/or edges, may have a radius of 1 mm or above improving water runoff from at least one of the exposed surfaces, preferably all the exposed surfaces; ledges and/or edges of the bearing housing; such as a radius of 2 mm or above; e.g. a radius of as 3 mm or above, such as a radius of 3.2 mm or above; e.g. a radius of 3.5 mm or above; such as a radius of 4 mm or above, e.g. 5 mm or above.

Preferably the bearing housing comprises no exposed surfaces; ledges and/or edges having a radius below 3.2 mm; such as below 3 mm; e.g. below 2.5 mm; such as below 1 mm; e.g. below 0.8 mm.

In an embodiment of the present invention all the exposed surfaces; ledges and/or edges of the bearing housing; may have an angle, may be founded or has a curvature of at least 3 degree relative to horizontal; e.g. 3.2 degree or above relative to horizontal, such as 3.5 degree or above relative to horizontal; e.g. 3.75 degree or above relative to horizontal; such as 4 degree or above relative to horizontal, e.g. 5 degree or above relative to horizontal.

In an embodiment of the present invention the exposed surfaces, ledges and/or edges of the bearing housing may be constructed, designed and/or fabricated in accordance with national standards and/or directives, like one or more of:
EN 1672-2:2005 Food machinery/General design principles/Part 2: Hygiene requirements.
EN ISO 14 159 2004 Safety of machinery—Hygiene requirements for the design of machinery.
Document 13 EHEDG guideline on the hygienic design of apparatus for open processes.

EHEDG Class I: The hygienic design criteria evaluation report concludes that the designs meet the criteria for hygienic equipment class I for components situated in the non-food area and are accessible for easy cleaning without dismantling.
3-A sanitary standard for machine levelling feet and supports.
USDA Guidelines for the sanitary design and fabrication of dairy processing equipment June 2001 and/or national regulations, such as one or more of:
852/2004 on the hygiene of foodstuffs.
853/2004 specific hygiene rules for food of animal origin.
854/2004 specific rules for the organization of official controls on products of animal origin intended for human consumption.
1935/2004 on materials and articles intended to come into contact with food.

The bearing housing according to the present invention may be provided with a bearing. A bearing according to the present invention may be a machine element that constrains relative motion to only the desired motion, and reduces friction between moving parts, e.g. a shaft, relative to a non-moving parts, e.g. the bearing housing. Preferably the bearing housing may comprise a bearing suitable for receiving a rotating shaft.

In an embodiment of the present invention the bearing may be a ceramic bearing or a stainless-steel bearing. Preferably, the bearing may be a ceramic bearing.

In an embodiment of the present invention the beating may be a fat free and/or a lubricant free bearing. Due to the construction, design and fabrication of the bearing housing and the reduced number of elements joint and protected by a sealing ensure a waterproof bearing housing, preferably a long-term waterproof property, the bearing housing according to the present invention.

In an embodiment of the present invention the bearing housing consist essentially of a bearing housing body having two or more bearing housing feet (preferably between 2 and 4 bearing housing feet) extending from the bearing housing body by means of a arm, a joint (and a sealing) between the bearing housing body and a removable flat cover; a joint (and a sealing) between the bearing housing body and a removable bearing housing cover; a joint (and a sealing) between each of the bearing housing feet of the bearing housing body and the base; and a joint (and a sealing) between each of the bearing housing feet of the bearing housing body and each of the bolts used to attach the bearing housing to the base.

Preferably, the bearing housing according to the present invention comprises (or consist essentially) of the following components:
a bearing housing body;
one or more bearing housing feet extending from the bearing housing body by means of a arm,
a removable flat cover and a joint (and a sealing) between the bearing housing body and the removable flat cover;
a removable bearing housing cover and a joint (and a sealing) between the bearing housing body and the removable bearing housing cover;
a joint (and a sealing) between each of the bearing housing feet of the bearing housing body and a base;
and a joint (and a sealing) between each of the bearing housing feet of the bearing housing body and each of the bolts used to attach the bearing housing to the base,
wherein the components may be configured with contours, which are adapted to the surfaces of the components and thereby substantially ensure continuous surfaces of the components of the bearing housing.

In a preferred embodiment of the present invention the bearing housing may be a hygienic bearing housing, meaning that the bearing housing is adapted to be used in a hygienic environment by preventing access of microorganisms and dirt to the inner space of bearing housing by providing a permanent sealing and by allowing cleaning with water and chemicals by preventing water and water-soluble components to enter the bearing housing.

In the context of the present invention the term "hygienic bearing housing" relates to a bearing housing adapted for reducing or preventing dirt, grime, microbial material, or other kind of fouling to access gap; joints; pits; folds; cracks; crevices; or other imperfections, in or between connecting surfaces or elements.

In an embodiment of the present invention the bearing housing according to the present invention may be provided with a built-in sensor. Preferably, the built-in sensor may transmit data, such as operating data or construction data to a mobile device and/or to a cloud surveillance of the bearing housing.

By introducing such sensor into the bearing housing according to the present invention a safer operation, a more efficient operation, an improved maintenance and/or a reduced downtime of the machinery may be provided.

In an embodiment of the present invention the sensor is implemented into the removable bearing housing cover.

In an embodiment of the present invention the sensor may be configures to monitor one or more of vibrations, temperature, leakage, moisture, exterior cleaning and/or location of the bearing housing.

A preferred embodiment of the present invention relates to the use of the bearing housing according to the present invention, for use in environments with high hygienic requirements, high cleaning requirements and/or environments where low (or no) deposit or accumulation of dirt, grime, microbial material and/or allergens is accepted.

Preferably, the present invention relates to the use of the bearing housing according to the present invention, for use in food production industry, feed production industry, and/or pharmaceutical industry.

A preferred embodiment of the present invention relates to a device comprising a bearing housing according to the present invention.

The base may be a part of a machine, a device, an equipment, or the like. Preferably, the machine, the device, or the equipment may be a conveyer belt for the food production industry, feed production industry, and/or pharmaceutical industry.

In an embodiment of the present invention, the device may be a hygienic device.

It should be noted that embodiments and features described in the context of one of the aspects of the present invention also apply to the other aspects of the invention.

The invention claimed is:

1. A seal formed as a sleeve (4, 40) comprising a circular front-end (41) provided with a front-end circular opening (45) and a circular back-end (42) provided with a back-end circular opening (46), and a circular opening (6, 49) going through the centre (43) of the circular front-end (41) and of the circular back-end (42), extending between the front-end circular opening (45) and the back-end circular opening (46), wherein the back-end (42) is connected to the front-end (41) by a spherical structure (44),
wherein the diameter of the circular opening (6, 49) increases from the front-end circular opening (45) to the back-end opening (46) and the front-end circular opening (45) is provided with a lip seal (47).

2. The seal according to claim 1, wherein the seal is a spherical seal.

3. The seal according to claim 1, wherein the seal is a slide bearing providing a sealing contact with a rotating shaft inserted through the circular opening (6, 49) of the seal.

4. The seal according to claim 1, wherein the seal comprises a polymer material.

5. The seal according to claim 1, wherein the seal comprises an olefin compound selected from the group consisting of polypropylene, polyethylene or a combination of polypropylene and polyethylene.

6. The seal according to claim 1,
wherein the seal comprises anti-rotating means (50a, 50b) which anti-rotating means ensures that the seal does not rotate together with the shaft, said anti-rotating means comprising a complementing combination of a depression and a protrusion,
and wherein either the depression (50a) or the protrusion (50b) is part of the seal and the complementing protrusion or depression is part of a bearing housing or of a bearing housing cover for the bearing housing.

7. A bearing housing (1) comprising a bearing body (2) for holding a bearing (3); and a seal forming a shaft insertion (6, 49) extending between a front-end circular opening (45) and a back-end circular opening (46) for inserting a shaft into the bearing housing (1), the seal is formed with a spherical outer surface (4a) which is movable in contact with the bearing housing body (2) and the seal rests on the bearing (3) when installed in the bearing housing body (2), wherein the seal (4) provides a water tight sealing contact with the shaft,
wherein the bearing (3) is installed inside the bearing housing body (2) and the bearing (3) comprises an outer ring with a spherical outer surface,
and wherein the seal and the bearing (3) are capable of angular movement relative to the bearing housing.

8. The bearing housing (1) according to claim 7, wherein the bearing housing comprise the following components:
one or more bearing housing feet extending from the bearing housing body by means of an arm,
a removable flat cover and a joint between the bearing housing body and the removable flat cover;
a removable bearing housing cover and a joint between the bearing housing body and the removable bearing housing cover;
a joint between each of the bearing housing feet of the bearing housing body and a base;
and a joint between each of the bearing housing feet of the bearing housing body and each bolt used to attach the bearing housing to the base,
wherein the components are configured with contours, which are adapted to the surfaces of the components and thereby substantially ensure continuous surfaces between adjacent components of the bearing housing.

9. The bearing housing (1) according to claim 7, wherein the bearing housing comprises the following components:
one or more bearing housing feet (7) extending from the bearing housing body (2) by means of an arm (10);
a removable flat cover (2c) and a joint between the bearing housing body (2) and the removable flat cover (2c);
a removable bearing housing cover (2b) and a joint between the bearing housing body and the removable bearing housing cover;
a joint between each of the bearing housing feet of the bearing housing body and a base; and a joint between each of the bearing housing feet of the bearing housing body and each bolt used to attach the bearing housing to the base, wherein a seal is provided between at least two of the bearing housing components of the bearing housing, and the components are configured with contours, which are adapted to the surfaces of the components and thereby substantially ensure said surfaces of adjacent components collectively define a continuous surface.

10. The bearing housing according to claim 7, wherein the seal is a spherical seal.

11. The bearing housing according to claim 7, wherein the seal is a slide bearing providing a sealing contact with a rotating shaft inserted through the circular opening (6, 49).

12. The bearing housing according to claim 7, wherein the front-end circular opening (41) of the seal is provided with a lip seal (47).

* * * * *